United States Patent
Arnone et al.

(10) Patent No.: US 7,587,609 B2
(45) Date of Patent: Sep. 8, 2009

(54) METHOD AND SYSTEM FOR SECURE ALERT MESSAGING

(75) Inventors: David J. Arnone, West Trenton, NJ (US); Alex Kosoy, Maywood, NJ (US); David R. Olivares, West New York, NJ (US); Gunjan Samtani, Secaucus, NJ (US); David J. Sexton, New York, NY (US)

(73) Assignee: UBS Financial Services Inc., Weehawken, NJ (US)

( * ) Notice: Subject to any disclaimer, the term of this patent is extended or adjusted under 35 U.S.C. 154(b) by 79 days.

(21) Appl. No.: 11/824,115

(22) Filed: Jun. 29, 2007

(65) Prior Publication Data

US 2007/0255957 A1  Nov. 1, 2007

Related U.S. Application Data

(63) Continuation of application No. 10/369,192, filed on Feb. 18, 2003, now Pat. No. 7,240,212.

(51) Int. Cl.
 *H04L 9/00* (2006.01)
(52) U.S. Cl. ................ 713/182; 726/20; 709/206
(58) Field of Classification Search .......... 726/20
 See application file for complete search history.

(56) References Cited

U.S. PATENT DOCUMENTS

| 6,182,226 | B1 |   | 1/2001  | Reid et al. ............... 726/15 |
|-----------|----|---|---------|-----------------------------------|
| 6,324,648 | B1 | * | 11/2001 | Grantges, Jr. ........... 726/12   |
| 6,959,393 | B2 | * | 10/2005 | Hollis et al. ............ 726/21  |
| 7,272,716 | B2 | * | 9/2007  | Haller et al. ........... 713/156  |
| 7,366,900 | B2 | * | 4/2008  | Shambroom ............. 713/168    |
| 2001/0034791 | A1 | * | 10/2001 | Clubb et al. .......... 709/238 |
| 2002/0157020 | A1 |   | 10/2002 | Royer ..................... 726/11 |
| 2003/0046587 | A1 | * | 3/2003  | Bheemarasetti et al. ..... 713/201 |
| 2003/0131245 | A1 | * | 7/2003  | Linderman ............. 713/176    |
| 2003/0177390 | A1 | * | 9/2003  | Radhakrishnan ......... 713/201    |
| 2004/0068649 | A1 |   | 4/2004  | Haller et al. ........... 713/153  |

OTHER PUBLICATIONS

International Business Machines Corp., Pub. No. SC34-5349-01, "MQSeries™: Queue Manager Clusters," 1999.
International Business Machines Corp., Pub. No. GC33-0805-01, 2$^{nd}$ Ed., "MQSeries™: An Introduction to Messaging and Queuing," 1995.

* cited by examiner

*Primary Examiner*—Matthew B Smithers
(74) *Attorney, Agent, or Firm*—Proskauer Rose LLP

(57) ABSTRACT

An alert messaging system and method to securely transmit and receive alert messages via secure connection among one or more messaging servers and at least one client user station using a token-based, one-way handshake mechanism.

8 Claims, 12 Drawing Sheets

METHOD AND SYSTEM FOR SECURE ALERT MESSAGING

This application is a continuation of U.S. patent application Ser. No. 10/369,192, filed Feb. 18, 2003 (now U.S. Pat. No. 7,240,212). The entire teachings of the above applications are incorporated herein by reference.

This disclosure contains information subject to copyright protection. The copyright owner has no objection to the facsimile reproduction by anyone of the patent disclosure or the patent as it appears in the U.S. Patent and Trademark Office files or records, but otherwise reserves all copyright rights whatsoever.

BACKGROUND OF THE INVENTION

1. Field of the Invention

Embodiments of the present invention relate generally to messaging systems and, more particularly, to secure transfer of messages.

2. Description of Related Art

Alert messages have proven useful for informing a class of interested users of a change in circumstance associated with a given item or task. Alert messaging may be the process of reliably and securely disseminating messages to interested users associated with the task or event. Alert messaging may involve the use of a network, such as, but not limited to, a computer network, for securely distributing messages to user stations associated with the interested users. Such computer and/or network based systems for providing alert messages are useful for automating the generation, transmission and reception of these messages. An example of such an automated system that can be used for providing alert messages over a network is the MQ™ series of products available from IBM® Corporation, including the IBM® Websphere™ MQ™ product. Such systems may be typically used to support application-to-application communication, but not real-time message transmission to recipients using a public network.

Due to the important information that may be conveyed by the alert messages, it is desirable to secure the network against access by unauthorized users and to prevent false or corrupted alert messages from being intentionally propagated, as well as to prevent alert messages from being intentionally removed or deleted (e.g., stolen), as a result of which an action that needs to be taken as a result of a message may never take place because the proper recipient never received the alert. For example, alert messages may provide to a financial analyst updates on the status of an executed trade as it progresses from execution to settlement. Untrusted clients connecting to the system through exposed ports may pose a variety of security risks. In particular, loss of a message that provides information of a trade that must be reviewed and approved before it is sent to the exchange for execution can have a dramatic impact. During the time the message is being reviewed, the market conditions continue to change. If there was only one reviewer and that message were stolen, that review would never be communicated to the proper user and that trade would never be approved and thus would never execute.

Products have been developed to address these security concerns, including the MQSecure™ product available from Candle Corporation of El Segundo, Calif. and IBM®'s Policy Director™ for MQ™. However, these MQ™ systems used for messaging do not provide secure alert messaging for external user clients that are not MQ™ clients (i.e., a client that requires the use of MQ™ client or Candle Corporation client software). Furthermore, these products may require use of a two-way handshake security protocol.

SUMMARY OF THE INVENTION

In accordance with at least one embodiment of the invention, an alert messaging system and method are provided for securely transferring alert messages from an alerting system to one or more user stations. The alert messages may be provided in real-time and asynchronously in response to a change in status for an item of interest. In at least one embodiment, the user stations that receive alert messages may be securely coupled to one or more computing elements of an alert messaging system. The user stations may be remotely located from other portions of the alert messaging system. In at least one embodiment, secure messaging connections are provided to prevent the stealing of alert messages.

In particular, embodiments of an alert messaging system may include at least one server having a processor or an operator at a message generating application configured to output alert messages to one or more user stations for alerting and viewing. The alert messages may be transmitted to the user stations using a network. In at least one embodiment, the alert messaging system may include a cluster of servers for outputting alert messages and a second region of servers for receiving alert messages from servers in the cluster and for forwarding alert messages to a user station. The user station may include a user interface for outputting received alert messages to a user. The receiving user station may be a trusted client but not necessarily an internally-authenticated client of the internal messaging server clusters such as, in an embodiment, an MQ client. A trusted client may be a client that has successfully negotiated the account access, authorization, and/or authentication procedures used by a system to maintain the security integrity of the system. The user station may be coupled securely to at least one server of the second region using a secure network connection to prevent unauthorized access to the alert messaging system.

The alert messages provided by the alert messaging system may include a variety of messages including, but not limited to, review and release messages. Review and Release messages may be a particular type of alert message designed to provide users involved in reviewing trading activities, such as, for example, financial advisors who are reviewers, with immediate alerts regarding trades that require further review before execution in the course of a business day. Review and Release messages may include trade information such as, for example, the date and time of the trade execution; estimated settlement date; buy or sell indication; for securities, the ticker symbol, number of shares bought or sold, and price per share; and client identifier.

BRIEF DESCRIPTION OF THE DRAWINGS

The present invention will be readily appreciated and understood from consideration of the following detailed description of at least one embodiment of this invention, when taken with the accompanying drawings, in which same numbered elements are identical and.

DETAILED DESCRIPTION OF THE EMBODIMENTS

While the present invention will hereinafter be described in connection with various embodiments thereof, it will be understood that it is not intended to limit the invention to those embodiments. On the contrary, it is intended to cover all alternatives, modifications and equivalents as may be included within the spirit and scope of the invention as defined by the appended claims. At least one embodiment of the present invention relates to the use of a computer system for receiving and disseminating messages to registered users within an organization, where such information may be, for example, Review and Release messages reporting the progress of reviewing Consolidated Order Entry (COE) trade orders.

Embodiments of the present invention generally relate to a system and methods for transmitting and receiving alert messages. The alert messaging system may be implemented, for example, as portions of one or more suitably programmed general-purpose computers. The alert messages may be transmitted and received using an arrangement of computers or computing elements provided in communication using a network. In particular, in at least one embodiment one or more clusters of networked servers may be used for receiving alert messages generated by a transmitting system, such as a mainframe, and making available, as described herein, message information to one or more client user stations coupled to at least one of the servers through a De-Militarized Zone (DMZ) region using a network. The structure of the DMZ may serve to prevent illegal access which could allow corrupted messages. A client user station may receive an alert message and display the contents of the alert message to a user. An example of an alert message is a Review and Release message that may be transmitted to a client user station of a reviewing user to alert that user that a trade needs to be reviewed before sending it to the exchange for execution.

Security of the system from unauthorized users and the prevention of non-authentic or corrupt alert messages may be of paramount concern. Accordingly, in at least one embodiment, the alert messaging system of the present invention may include security features effective to prevent such unwanted intrusions. Examples of such security features may include a proxy service to isolate a group of servers from access by untrusted users, use of a secure transfer protocol between users and servers, and secure user registration procedures.

Figure 1:
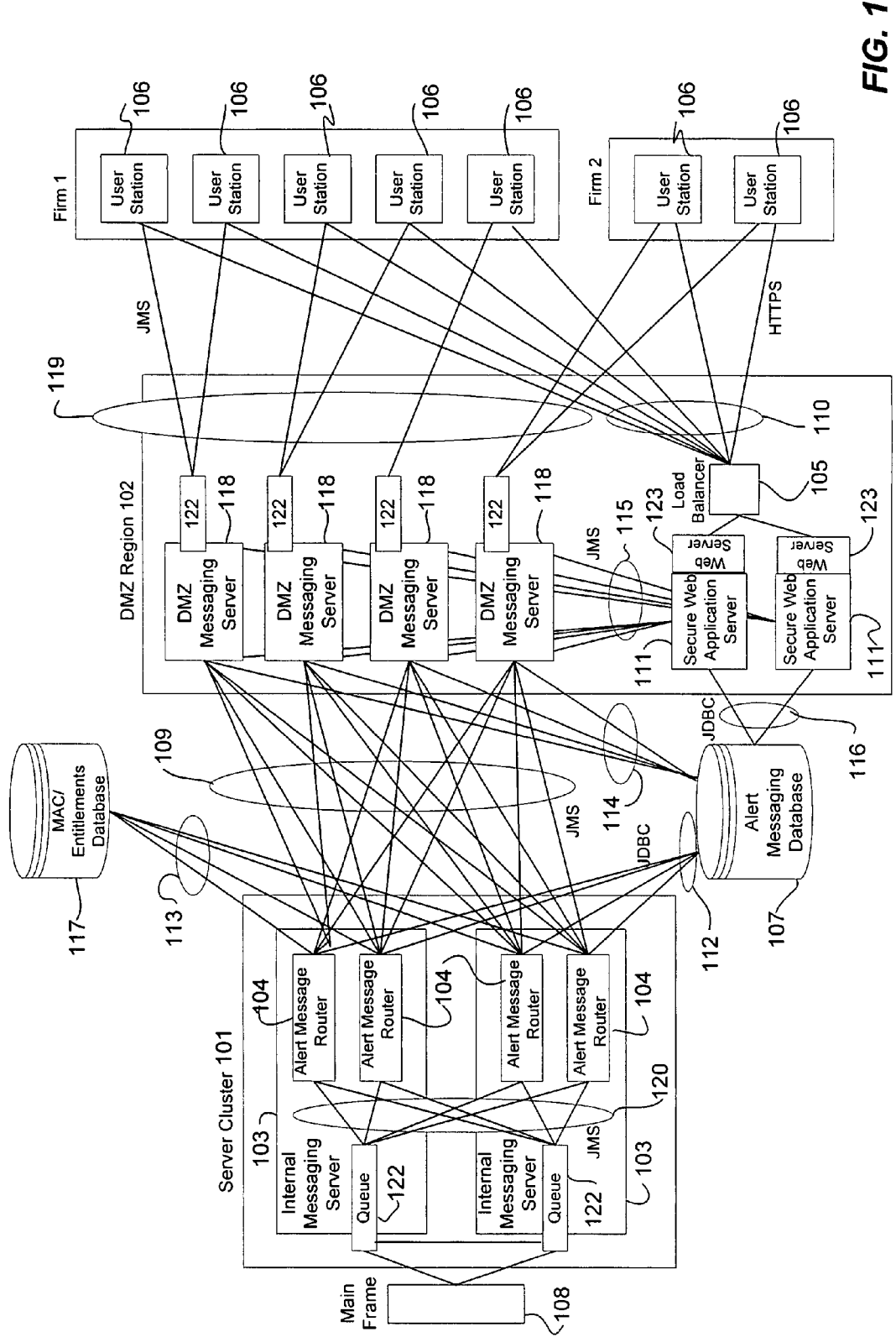
FIG. 1 is an illustrative functional block diagram of at least one embodiment of an alert messaging system.

At least one embodiment of an alert messaging system 100 according to the present invention is shown in FIG. 1. Referring to FIG. 1, an alert messaging system 100 may include a cluster 101 of one or more internal messaging servers 103 which may be operably coupled via a network 120 of one or more alert message router 104 processes per server, and a De-Militarized Zone (DMZ) region 102 in which is located one or more DMZ messaging servers 118 operably coupled to each of one or more secure web application servers 111. Alternatively, if the alert message router 104 is implemented using the same computing platform as the messaging server, then the network 120 may comprise an interface or a bus internal to the computing platform. The secure web application servers 111 may be operably coupled to a load balancer 105. In at least one embodiment, a web server 123 (for example, a Netscape™ web server) may be coupled to the user stations 106 through a load balancer 105. In at least one embodiment, the web server 123 and web application server 111 may be implemented using a single computing platform. Alternatively, the web application server 111 and the web server 123 may be implemented using separate computing platforms, in which case, the secure web application server 111 may be located behind the DMZ region 102, and the web server 123 may be located in the DMZ region 102 and coupled to the load balancer 105.

In an embodiment, each of the internal messaging servers 103 of the cluster 101 may be operably coupled to one or more other messaging servers 118 in the DMZ region 102 through one or more of the alert message router processes 104. The DMZ may be a region (i.e., DMZ region 102) where there exist a number of individual servers each accessible or connected to the internal messaging servers 103 (which may be a central MQ Server cluster) depicted at 101. In an embodiment, the internal messaging servers 103 of the cluster 101 and the DMZ messaging servers 118 of the DMZ region 102 may be coupled to the alert message routers 104 of the cluster 101 using a network 109, which may be an electronic or optical network. In at least one embodiment, the network 120 coupling the internal messaging servers 103 and the alert message routers 104 may provide communication in accordance with, for example, the Java™ Messaging Service (JMS) protocol. The messaging servers 118 in the DMZ region 102 may be coupled to one or more user stations (e.g., clients) 106 by a network 119. The messaging servers 118 in the DMZ region 102 may be implemented using, for example, JMS messaging servers. The cluster 101 may be a private network. The DMZ region 102 may serve as a protected region between the public network and the private network. The DMZ messaging servers 118 in the DMZ region 102 may operate individually (work load balanced) and each be accessible by any of the alert message routers 104 or router processes via the network 109 using, for example, JMS. For example, at the time of registration, the secure web application server 111 may determine a particular one of the DMZ messaging servers 118 to which the registering user may be assigned, thereby providing work load balancing, and then store this information in the alert messaging database 107.

The DMZ region 102 may include one or more secure web application servers 111 in addition to the DMZ messaging servers 118. In at least one embodiment, the secure web application servers 111 may include both a web application server 111 and a web server 123. Alternatively, the web application servers and web servers may be provided as physically separate servers 111 and 123. A web server may be a server configured to generate and output interactive pages to a user station using the world wide web and suitable for display using a web browser. A web application server may be a server configured to execute a server portion of a web-based application program, responsive to commands and data received from the client portion of the application program, and providing data and results to the client portion. In at least one embodiment, the secure web application servers 111 may be coupled to the user stations 106 through a web server 123 and, in turn, a load balancer 105 for equalizing the distribution of sessions supported at a given time by each of the secure web application servers 111. In at least one embodiment, the secure web application servers 111 may also be operably coupled to the user stations 106 via the network 110. The network 110 may be an electronic network that provides for secure communication between the user stations 106 and the secure web application servers 111 via Secure Socket Layer (SSL) connection in accordance with the Secure HyperText Transfer Protocol (HTTPS) such as, for example, the Internet. For example, generally, when the alert message routers 104 receive an alert message such as, for example, a Review and Release message from the mainframe 108 (or an alert message from some other application) the alert message router 104 may store the message in the alert messaging database 107. The alert message router 104 may then query the MAC/Entitlements database 117 to obtain an identification of the person (e.g., a financial advisor) who placed this order, and for an indication of the persons who reviews his or her orders. Identification information for each of the persons determined to be reviewers may then be entered into the alert messaging database 107. The alert message router 104 may then query the alert messaging database 107 to determine which of these reviewers are currently logged in to the alert messaging system 100. The alert message router 104 processes then send an alert message content notification through the DMZ region 102 messaging (e.g., MQ) servers 118 to the user stations 106 for those users who are registered. Upon receipt of the notification the user station may request the message content via the network 110 in accordance with the HTTPS protocol. Alert message content may then be obtained from the database 107 by the secure web application servers 111 via the network 116 and provided to the user clients 106 by the secure web application server 111. In at least one embodiment, only notifications are sent over the DMZ messaging servers 118, and no content is sent over the DMZ messaging servers 118, thereby minimizing the risk of an alert message not being transmitted due to, for example, being intercepted (e.g., stolen) by an unauthorized user station. Alert messages may be encrypted for further security.

The secure web application servers 111 may be coupled to an alert messaging database 107. The alert message routers 104 may be coupled to the alert messaging database 107 and a Moves, Adds & Changes (MAC)/Entitlements database 117. The secure web application servers 111 may access the alert messaging database 107 via the network 112. The alert message router 104 and the DMZ messaging server 118 may access the MAC/Entitlements database 117 via the networks 113 and 114, respectively. In an embodiment, the secure web application servers 111 only access the alert messaging database 107 via network 116. The alert messaging database 107 and MAC/Entitlements database 117 may include user access information and entitlements information for the internal messaging servers 103 and the secure web application servers 111 to respond to an access request received from a user station 106, including registration, for users who are already validly logged on. In at least one embodiment, logon and authentication of users is accomplished outside of the alert messaging system 100. Users who are logged on but not registered by the alert messaging system 100 do not receive alert message information from the alert messaging system 100. In an embodiment, registration may serve to clarify the state of the requesting user, define routing points to the alert messaging system 100 for that user, and provide protection for the message queue connections (e.g., the MQ queue locations in an embodiment). All subsequent accesses initiated from users 106 through the secure web application servers 111 to retrieve alert messages contained in the alert messaging database 107 are accomplished using the network 116.

Connections from the secure web application servers 111 and the alert message routers 104 to the alert messaging database 107 and the MAC/Entitlements database 117 may be accomplished using TCP/IP. The secure web application servers 111 and the alert message routers 104 may communicate with the alert messaging database 107 and the MAC/Entitlements database 117 in accordance with the Java Database Connectivity (JDBC) protocol, for example. Alternatively, database connectivity may be accomplished using a ColdFusion™ server engine either via Open Database Connectivity (ODBC) or Native Connections. In at least one embodiment, the information stored in, or maintained using, the alert messaging database 107 and the MAC/Entitlements database 117 may be provided in conformance with a database management system format such as, but not limited to, the Structured Query Language (SQL) format. The alert messaging application described herein may be stored using the alert messaging database 107 and the MAC/Entitlements database 117. In at least one embodiment, the alert messaging database 107 and the MAC/Entitlements database 117 may be, for example, implemented using the Sybase® database management system provided by the Sybase® Corporation of Emeryville, Calif. and executing on an IBM® RS6000™ workstation running AIX® version 4.2.1. The alert message router 104 and the secure web application server 111 may comply with the Java Database Connectivity (JDBC) standard and utilize thin type-4 drivers to communicate with the alert messaging database 107 to access stored message related information. In alternative embodiments, the alert messaging database 107 and the MAC/Entitlements database 117 may be implemented in accordance with the DB2 database product standard available from IBM® Corporation. Furthermore, alternatively, the alert messaging database 107 and the MAC/Entitlements database 117 may be a SQL Server 7.0 database supporting the ActiveX Data Object (ADO) and ODBC protocols provided by IBM® Corporation or Oracle® Corporation of Redwood Shores, Calif. The alert messaging database 107 and the MAC/Entitlements database 117 may further include information such as, but not limited to, database query and access instructions in the form of one or more scripts which, when executed by a processor, serve to store and retrieve data maintained using the alert messaging database 107 and the MAC/Entitlements database 117 according to the instructions contained in the script, and in particular regarding the data fields to be accessed, as well as their arrangement, provided in the response to the processor.

The internal messaging servers 103 may be coupled to a mainframe 108 using, for example, a network such as a Transport Control Protocol/Internet Protocol (TCP/IP) based network or an Ethernet™ connection. In at least one embodiment, the mainframe 108 may generate alert messages in response to a change in status for an item of interest. The mainframe 108 may be an existing or legacy system such as an internal trade reporting system used by a trading house for tracking the progress of client transactions. The mainframe 108 may output alert messages to a messaging queue 122 from which the messaging servers 103 obtain the alert message information for distribution. In an embodiment, messages may be sent from the mainframe 108 in accordance with the message queue or "MQ" protocol in which the alert message information is written to a specific queue 122 of the cluster 101.

The DMZ region 102 may be configured to form a neutral zone or buffer, also known to those of skill in the art as a "De-Militarized zone" or DMZ. A DMZ may be a computer host or network positioned between two groups of computing elements, such as between a company's private network and an outside public network. As such, the DMZ region 102 may isolate the cluster 101 from external computing nodes such as the user stations 106. In at least one embodiment, because the user stations 106 are not permitted to be in direct communication with the internal messaging servers 103, the DMZ messaging servers 118 of the DMZ region 102 may serve as connection points for the clients of user stations 106 and the internal messaging servers 103. In other words, in such embodiments a DMZ messaging server 118 of the DMZ region 102 may push a notification to a user station 106 in the public domain network which the DMZ messaging server 118 received as a pushed notification from the routing process on the messaging servers 103 of the cluster. "Push" may refer to the use of a technology that asynchronously "pushes" content to a client. In at least one embodiment, the asynchronous activity of the internal messaging servers 103 (e.g., the MQ servers) in the cluster 101 do not cause the DMZ messaging servers 118 in the DMZ region 102 to access the secure web application servers 111; rather, it is actions requested by the client, which result in requests to the secure web application servers 111, that in turn may push new state information to the DMZ messaging servers 118 in the DMZ region 102 using the network 115 to broadcast the change notifications to user station 106 clients. This configuration and method serves to securely isolate the internal messaging servers 103 of the cluster 101 from the public network as well as the computing elements in the public network domain, as well as providing a real-time refresh for message state change without the need to propagate the state change information throughout the alert messaging system 100 again. Therefore, if an unauthorized user penetrates the alert messaging system 100, the unauthorized user will not gain access to the information maintained by the internal messaging servers 103 of the cluster 101. In contrast to the capabilities of the internal messaging servers 103 in the cluster 101 acting in conjunction with the router 104 processes, the DMZ messaging servers 118 in the DMZ region 102 may, in an embodiment, merely receive messages passed to them and place them in their queue. In at least one embodiment, the DMZ region 102 may include two firewalls. One firewall may be located between the user stations 106 and the other components of the DMZ region 102 as shown in FIG. 1. The second firewall may be located between the cluster 101 and the DMZ region 102. In an alternative embodiment, the DMZ region 102 may be a single firewall located between the cluster 101 and the user stations 106.

Certain of the user stations 106 may be associated with a particular company, institution, or client. The user station 106 may be configured to receive alert messages and include a user interface configured to output or display the contents of the received alert messages to a user. The user station 106 may further include a client portion of an alert messaging application that interacts with a server portion at a DMZ messaging server 118 of the DMZ region 102. The client portion of the alert messaging application at the user station 106 may receive alert messages from the server portion of the alert messaging application. In at least one embodiment, the user station 106, via the client portion of the alert messaging application, may request all content for an alert message for which a notification has been received. The client portion of the alert messaging application may also provide alert message content and information to the user interface portion of the user station 106 for output.

The networks 109, 110, 112, 113, 114, 115, 116, 119 and 120 may be one or more packet-based messaging networks such as, but not limited to, a Transmission Control Protocol/Internet Protocol (TCP/IP) based network. In such embodiments, the TCP/IP based networks may be implemented using or involve a Local Area Network (LAN), Wide Area Network (WAN), the Internet, or an Intranet, for example, or any combination thereof. All or a portion of the networks may be implemented using a variety of transmission media such as, but not limited to, landline, telephone, cable, or wireless link. Furthermore, the network 110 may include transmission security such as, but not limited to, a Secure Socket Layer (SSL). Alternatively, or in addition, encryption may be used to provide transmission privacy and/or source and destination authentication such as a Pretty Good Privacy (PGP) based application, or other public key cryptography scheme. In an embodiment, the networks 110 and 119 may be implemented using a public network such as, for example, the Internet. In an embodiment, the networks 112-116 may be internal or private networks. Networks 112-114 and 116 may utilize Remote Procedure Call (RPC) for interprocess communication and data transfer. The network 115 may communicate using the Java Messaging Service (JMS).

The messaging servers 103 and 118 and the web application portion of secure web application server 111 may be implemented using, for example, an IBM MQ™ server such as, for example, the IBM Websphere® MQ server available from IBM Corporation. Further information regarding the IBM Websphere® MQ server and IBM MQ™ products is available from IBM Corporation in various publications such as, for example, IBM Redbook GC33-0805, "An Introduction to Messaging and Queuing," and IBM Redbook SC34-5349, "Queue Manager Clusters," each of which is available from IBM Corporation using the world wide web. Such MQ servers may be accessed using one or more MQ ports. In at least one embodiment, one or more MQ ports of DMZ messaging servers 118 of the DMZ region 102 are exposed via the network 119 to external nodes such as the user stations 106. The number of exposed ports may correspond to the number of DMZ messaging servers 118 included in the DMZ region 102.

In an embodiment, the web server portion of secure web application server 111 may be implemented using an iPlanet® web server available from Sun Microsystems™ of Santa Clara, Calif. and Netscape Corporation of Mountain View, Calif. Alternatively, the web server portion of secure web application server 111 may be implemented using a Sun™ ONE Application Server 7 available from Sun Microsystems™, or any other web server.

In at least one embodiment, the networks 110 and 119 may be a packet-based network such as, for example, the Internet. In at least one embodiment, the transport between DMZ messaging server 118 in the DMZ region 102 and the user station 106 may be based on a message passing or message queuing protocol, such as, for example, IBM's MQ™ protocol. In at least one embodiment, the transport between the secure web application server 111 and the user stations 106 may be a socket-based protocol, such as, for example, HTTPS.

The user station 106 may be implemented using a personal computing device having a browser, such as a web browser application. Alternatively, the user station 106 may be implemented using a wireless terminal such as a personal digital assistant, a cellular or portable telephone terminal, or an Internet appliance, configured for electronic or optical communication with the DMZ messaging server 118. An Internet appliance may be, for example, a computer with minimal memory, disk storage and processing power designed to connect to a network, especially the Internet. The alert messaging system 100 may support any number of such stations 106, including as few as one station. The user stations 106 may be collocated with the DMZ messaging server 118, or located remotely from the DMZ messaging server 118 and coupled to the DMZ messaging server 118 using the network 119, as shown in FIG. 1. Access to the alert messaging application and the alert messaging database 107 may require that the user station 106 have a web browser such as, for example, Microsoft® Internet Explorer™ 5.0 or higher. However, in at least one embodiment, all access to the alert messaging system 100, including any database 107 or 117, by a user station 106 only occurs through the DMZ region 102.

Figure 2:
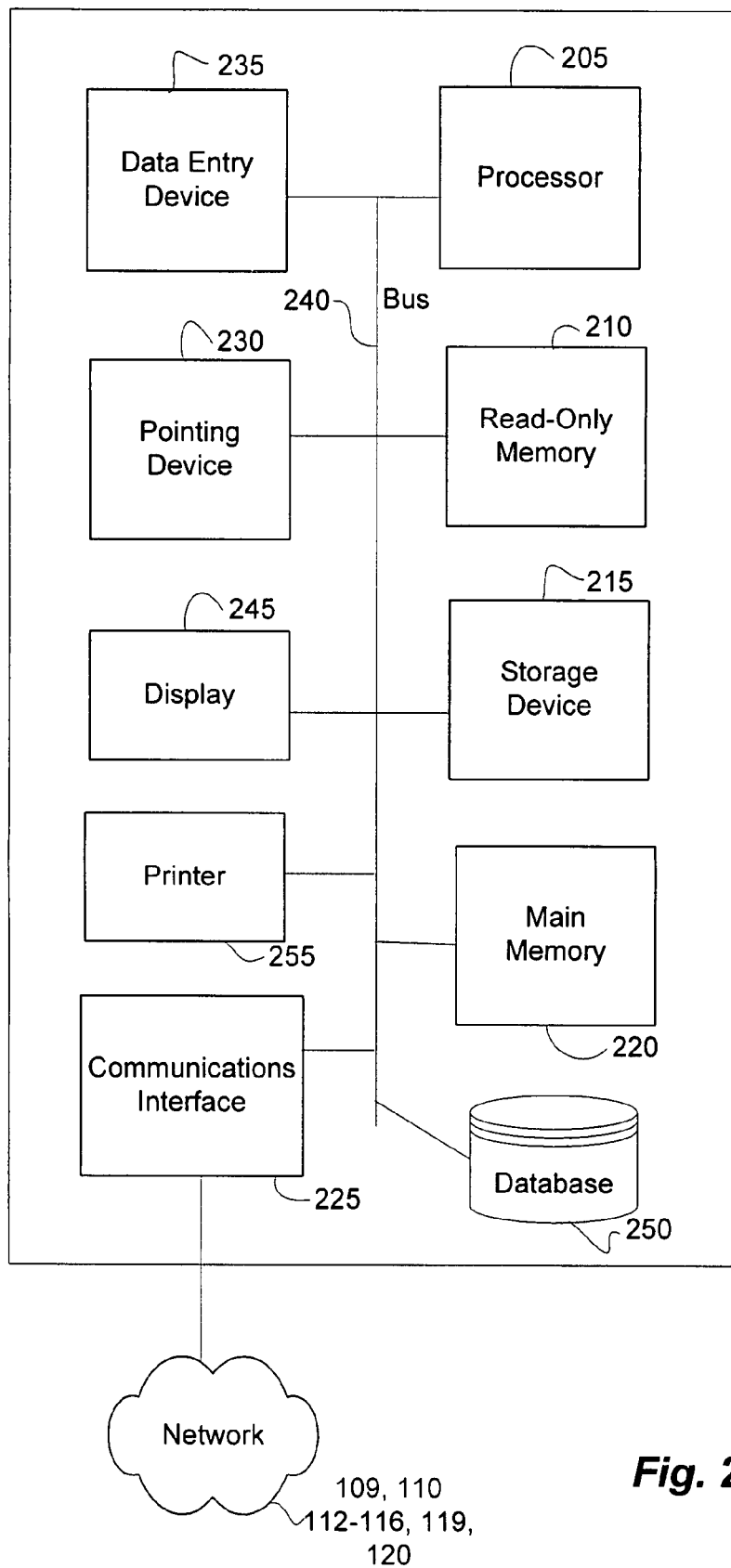
FIG. 2 is a block diagram of a computer system that may be used to implement the computing platform for the servers and user station in an embodiment.

FIG. 2 is a block diagram of a computer system 200 that may be used in some embodiments to implement the computing platform for the messaging servers 103 and 118, user station 106, or secure web application server 111. (The mainframe 108 may be implemented according to a mainframe computer architecture such as, for example, an IBM® Series 360 mainframe.) The computing system 200 may be implemented as or include one or more personal computers, workstations, handheld personal data assistants, Internet appliances (i.e., a computer with minimal memory, disk storage and processing power designed to connect to a network, especially the Internet), or controllers. The computer system 200 may include a bus 240 or other communication mechanism for communicating information, and a processor 205 coupled with the bus 240 for processing information. The computer system 200 also may include a main memory 220, such as a Random Access Memory (RAM) or other dynamic storage device, coupled to the bus 240 for storing information and instructions to be executed by the processor 205. The main memory 220 also may be used for storing temporary variable or other intermediate information during execution of instructions to be executed by the processor 205. The computer system 200 further may include a Read-Only Memory (ROM) 210 or other static storage device coupled to the bus 240 for storing static information and instructions for the processor 205. A storage device 215, such as a magnetic disk or optical disk, may be provided and coupled to the bus 240 for storing information and instructions.

The processor 205 may fetch the instructions, decode them, and act or instruct other elements 210-250 to, for example, transfer data to or from the memory 220 or to work in combination with the data entry device 235 or the display 245 (for example, to input or output data), etc. The processor 205 may actually be implemented as more than one processor. It should be appreciated that the processor 205 may be implemented as a general purpose microprocessor, for example, in a central processing unit, a microcontroller, or other similar device.

In at least one embodiment, a database 250 may be coupled to the bus 240 for storing static information and software instructions. Information stored in or maintained using the database 250 may be provided in conformance with a database management system format such as, but not limited to, the SQL format. The database 250 may be a SQL database implemented using the Sybase® database management system provided by the Sybase® Corporation of Emeryville, Calif. Alternatively, the database 250 may be provided by the Oracle® Corporation of Redwood Shores, Calif., or SQL Server 7.0 database supporting the ADO and ODBC protocols provided by IBM® Corporation. The database 250 may include information including, but not limited to, database query and access instructions in the form of one or more scripts which, when executed by a processor such as the processor 205, serve to store and retrieve data maintained using the database 250 according to the instructions contained in the script, and in particular regarding the data fields to be accessed, as well as their arrangement, provided in the response to the processor 205. In an embodiment, the alert messaging database 107 and/or MAC/Entitlements database 117 may be implemented using the database 250.

According to at least one embodiment of the present invention, aspects of the alert messaging system 100 as described herein may be provided by the computer system 200 in response to the processor 205 executing one or more sequences of instructions contained in the main memory 220. Such instructions may be read into the main memory 220 from another computer-readable medium, such as the storage device 215 or the database 250. Execution of the sequences of instructions contained in the main memory 220 may cause the processor 205 to perform the process steps described herein. One or more processors in a multi-processing arrangement may also be employed to execute the sequences of instructions contained in the main memory 220. Alternatively, hardwired circuitry may be used in place of or in combination with software instructions to implement the invention. Thus, embodiments of the invention are not limited to any specific combination of hardware circuitry and software.

The computer system 200 may be coupled via the bus 240 to a display 245 and a printer 255 for outputting information to a computer user. In one embodiment, the display 245 may be a Cathode Ray Tube (CRT) computer display monitor capable of displaying information using multiple colors. Alternatively, the display 245 may be a liquid crystal display, a monochrome monitor, a web-enabled wireless terminal or handheld terminal such as, for example, a Personal Digital Assistant (PDA). The computer system 200 may include other output devices as well such as, but not limited to, a printer.

A data entry device 235, including alphanumeric and other keys, may be coupled to the bus 240 for communicating information and command selections to the processor 205. Another type of user input device which may be coupled to the bus 240 is a pointing device 230, which may be a computer mouse, trackball, cursor direction keypad, tactile directional fingerpad, or other such device for allowing a user to control cursor location and movement on the display 245, and for communicating direction information and command selections to the processor 205. This pointing device 230 typically has two degrees of freedom in two axes, a first axis (e.g., x) and a second axis (e.g., y), that allows the pointing device to specify positions in a plane.

The term "computer-readable medium" as used herein refers to any medium that participates in providing instructions to the processor 205 for execution. Such a medium may take many forms, including, but not limited to, non-volatile media, volatile media, and transmission media. Non-volatile media include, for example, optical or magnetic disks, such as the storage device 215. Volatile media include dynamic memory, such as the main memory 220. Transmission media can also take the form of acoustic or light waves, such as those generated during Radio Frequency (RF) and InfraRed (IR) communications. Common forms of computer-readable media include, for example, floppy disk, a flexible disk, hard disk, magnetic tape, any other magnetic medium, a Compact Disc Read Only Memory (CD ROM), Digital Video Disc (DVD) or any other optical medium, punch cards, paper tape, any other physical medium with patterns of holes, a Random Access Memory (RAM), a Programmable Read Only Memory (PROM), an Erasable Programmable Read Only Memory (EPROM), a Flash EPROM, any other memory chip or cartridge, a carrier wave as described hereinafter, or any other medium from which a computer can read.

Various forms of computer-readable media may be involved in carrying a sequence of one or more instructions to the processor 205 for execution. For example, the instructions may initially be borne on a magnetic disk of a remote computer. The remote computer may load the instruction into its dynamic memory and send the instructions over a telephone line using a modem. A modem local to the computer system 200 may receive the data on the telephone line and use an infrared transmitter to convert the data to an infrared signal and place the data on the bus 240. The bus 240 may carry the data to the main memory 220, from which the processor 205 retrieves and executes the instructions. The instructions received by the main memory 220 may optionally be stored on the storage device 215 either before or after execution by the processor 205.

The computer system 200 may also include a communication interface 225 coupled to the bus 240. The communication interface 225 may provide a two-way data communication coupling to the network 104. For example, the communication interface 225 may be a modem or an Integrated Services Digital Network (ISDN) card to provide a data communication connection to a corresponding type of telephone line. As another example, the communication interface 225 may be a LAN card to provide a data communication connection to a compatible LAN. Wireless links may also be implemented. In any such implementation, the communication interface 225 sends and receives electrical, electromagnetic, or optical signals that carry digital data streams representing various types of information.

The communication interface 225 may provide data communication through one or more networks to other data devices. For example, the communication interface 225 may provide a connection through a local network to a host computer or to data equipment operated by an Internet Service Provider (ISP). The ISP may in turn provide data communication services through a worldwide packet data communication network such as the Internet. These networks use electrical, electromagnetic, or optical signals that carry digital data streams. These signals are exemplary forms of carrier waves transporting the information.

The communications interface 225 may include an Ethernet interface or a LAN communication card, a dial-up modem interface using the PSTN, an intranet, or any combination thereof.

The computer system 200 may send messages and receive data, including program codes, through the network(s) and the communication interface 225. In the Internet example, a server might transmit a requested code for an application program through the Internet, ISP, and the communication interface 225. One such downloaded application may, for example, provide for alert messaging as described herein. The received code may be executed by the processor 205 as it is received, and/or stored in the storage device 215, or other non-volatile storage for later execution. In this manner, the computer system 200 may obtain an application code in the form of a carrier wave.

The secure web application server 111 may receive commands and data from the user station 106 and program code and data may be output to the user station 106 using the network 110 via a web server portion of the secure web application server 111 of the DMZ region 102. In an embodiment, commands and data may be received in the form of an HTTPS request to the secure web application server 111 through the load balancer 105. In an embodiment, the secure web application server 111 may generate and transmit the requested information to the requesting user in the form of a fixed-length string of plain text which may be formatted according to, for example, the American National Standard Code for Information Interchange (ASCII) and transmitted according to the HTTPS protocol. In an alternative embodiment, the secure web application server 111 may generate and transmit the requested information to the requesting user via Hypertext Transfer Markup Language (HTML) formatted or eXtensible Markup Language (XML) formatted pages, which may be provided as World Wide Web pages, using the network 110. The network 110 in this case may be, for example, a network of interconnected networks such as the Internet, a LAN, a WAN, an intranet including any of these, and/or the PSTN. Such interactive pages transmitted and received using the network 110 may conform to the SSL protocol.

The communications interface 225 may further include a web browser or a so-called thin client. A thin client may be a client portion of an application designed to require little memory so that the bulk of the data processing occurs on a corresponding server. In at least one embodiment, a thin client may be Java-based. A thin client may utilize a two or more tiered client server model. In this model, the client may run a minimal set of services that provide functionality to interface with at least one server. A web browser may be a thin client.

In at least one embodiment, the messaging servers 103 and 118 may be implemented using a workstation such as, for example, an IBM RS6000™ workstation available from IBM Corporation of Armonk, N.Y., running AIX™ and IBM JDK™ version 1.2.2 and MQ version 5.2. In at least one embodiment, the secure web application server 111, which may include a web server, may be implemented using a workstations such as, for example, a Sun® workstation available from Sun Microsystems® of Santa Clara, Calif., running the Solarix™ operating system and Web Application Server (WAS) version 3.5.6. Alternatively, the messaging servers 103 and 118 and the secure web application server 111 may run, for example, the Windows® NT network operating system available from Microsoft® Corporation of Redmond, Wash. In at least one embodiment, the user station 106 may be implemented using an IBM-compatible personal computer or computer workstation running Microsoft Windows NT® version 4.1, service packs 5 to 6a. The web browser displays data and is capable of communicating with other computers via a network such as, for example, the Internet or an intranet. The web browser provides a user with a way to navigate, via, for example, hyperlinks which are selected by the pointing device 230 such as a computer mouse, or as typed in by the user. The web browser uses a protocol such as, for example, HTTP or File Transfer Protocol (FTP), to transmit data of various content such as, for example, HTML formatted documents, plain text documents, graphic images, and XML documents for presentation to the user via the display 245. Web pages formatted in accordance with HTML or XML may also be provided in accordance with the eXtensible Style Language (XSL) specification available from the World Wide Web Consortium. XSL is useful for separating style from content as well as for providing a common interface for sharing of web pages across applications. The web browser may also run or execute programs, such as Java applets including sequences of instructions provided in accordance with the Java programming language, or JavaScript. The web browser may be, for example, Internet Explorer® version 5.0 or higher by Microsoft® Corporation, Netscape Navigator® by Netscape®, America Online® browser, or any other Java-compatible web browser.

Instructions executed by the processor 205 from the main memory 220 may include, for example, application software instructions that cause the processor 205 to perform operations as described herein. These application instructions may be implemented in the form of source code statements provided in accordance with, for example, C++, Visual C++® and Visual Basic® higher order programming languages, development kits for which are available from Microsoft® Corporation. Application instructions may also include database scripts for accessing, storing, or selectively retrieving information contained in the database 250 or the alert messaging database 107. The database scripts may be contained in the storage device 215 or may be stored using the database 250 or the alert messaging database 107. The database scripts may be implemented in the form of programming statements provided in accordance with, for example, Sybase compatible Structured Query Language (SQL). Alternatively, SQL version 7.0 database management system query language may be used, and/or the IBM DB2® system. Other database implementations are possible, including those available from Oracle® or Transact SQL in accordance with the ColdFusion® database management system.

Application software instructions may include a user interface portion, which may be a graphical user interface (GUI) portion, for rendering interactive pages or display screens by which a user may provide data to and receive information from the computer system 200 and the database 250, alert messaging database 107 or MAC/Entitlements database 117 using a human-machine interface such as, but not limited to, the display 245. Interactive pages may include user dialog boxes for accepting user entered information. In particular, the GUI portion may prompt the user to enter data by providing an interactive dialog box or message box instructing the user to enter particular data, or to select from among a multitude of options provided using a pull-down menu. The human-machine interface may also include a hard copy generating device such as a printer, such as, but not limited to, the printer 255. A user may interact with the computer system 200 via the GUI provided by the GUI portion by using the pointing device 230 and the data entry device 235. The GUI portion may place the output of the computer system 200 in a format for presentation to a user via the display 245. In at least one embodiment, the GUI implementation may include a sequence of Microsoft® ActiveX™ instructions useful for, as an example, provision of interactive page controls. Alternatively, the GUI may be implemented, for example, as a sequence of Java Swing® instructions. Java Swing® is part of the Java™ Foundation Classes (JFC) in the Java™ platform. The JFC encompasses a group of features to aid in the development of GUIs. Swing® provides components for buttons to split panes and tables. The Java™ classes and logic of the GUI may be implemented in Java™, for example.

In particular, a user may select a particular data entry field of an interactive display page presented using the display 245 by using the pointing device 230 or the data entry device 235 to select that field. Upon selecting a field, a user may then enter information into the data entry field using the data entry device 235. After the user has entered data into the data entry field, the user may cause the GUI portion to input the user-entered information to the computer system 200 using the pointing device 230 to select a corresponding display icon or command button.

Thus, the user station 106 may send messages, including program codes, through the network 110 and the communications interface 225, and may receive data through the networks 110 and 119. In at least one embodiment, the user station 106 might transmit a requested code for an application program through the Internet, ISP, and/or the communication interface. In accordance with at least one embodiment, one such downloaded application provides for user interaction with the alert messaging system 100 using the interactive displays or interactive pages described herein. The received code may be executed by the processor 205 as it is received, and/or stored in a non-volatile storage device for later execution. In this manner, computer system 200 may obtain an application code in the form of a carrier wave.

The secure web application server 111 may receive commands and data from the user station 106 and program code and data may be output to the user station 106 using the network 110 via the secure web application server 111 of the DMZ region 102, while commands and data may be received in the form of an HTTPS request to the secure web application server 111 through the load balancer 105. In at least one embodiment, the secure web application server 111 may generate and transmit the requested data to the requesting user station 106 via HTML formatted or XML formatted pages, which may be provided as World Wide Web pages, using the network 110. Furthermore, in an embodiment, the DMZ messaging server 118 of the DMZ 102 may only transmit directly to a user station 106 via the network 119 a notification of a new alert message received, and, in some embodiments, a return code that a notification was successfully removed from the message queue. As discussed previously, the networks 110 and 119 may be, for example, a network of interconnected networks such as the Internet, a LAN, a WAN, an intranet including any of these, and/or a PSTN. The communications interface 225 may further include a web browser or thin client that is a client portion of an application designed to require little memory so that the bulk of the data processing occurs on a corresponding server. In at least one embodiment, the thin client may be Java-based. The web browser may be configured to display data and communicate with other computers via a network such as, for example, the Internet or an intranet. The web browser may provide a user with a way to navigate, via, for example, hyperlinks which may be selected by the pointing device (such as a computer mouse), or as typed in by the user. The web browser uses a protocol such as, for example, HyperText Transfer Protocol (HTTP) or File Transfer Protocol (FTP), to transmit data of various content such as, for example, HTML formatted documents, plain text documents, graphic images, and XML documents for output presentation to the user via the display.

The messaging servers 103 and 118 may include a sequence of programmed instructions, which, upon execution, are operable to configure the computer system 200 to carry out the alert messaging functions described herein. These software instructions may be implemented using, for example, Javascript® instructions. Other implementations are possible using, for example, the C++ or Visual Basic™ programming languages, Java™, or any combination thereof. The messaging server 103 may thereby be configured, using a sequence of programming instructions, for example, to push alert message notifications, or to receive alert message information from a computer or computer system external to the alert messaging system 100. The secure web application server 111 may be configured, using a sequence of programming instructions, for example, to assemble and arrange the alert message request information into a format suitable for transfer using the network 110. The messaging servers 103 and 118 may be configured to output alert messages to the user station 106 using the network 119.

Figure 3:
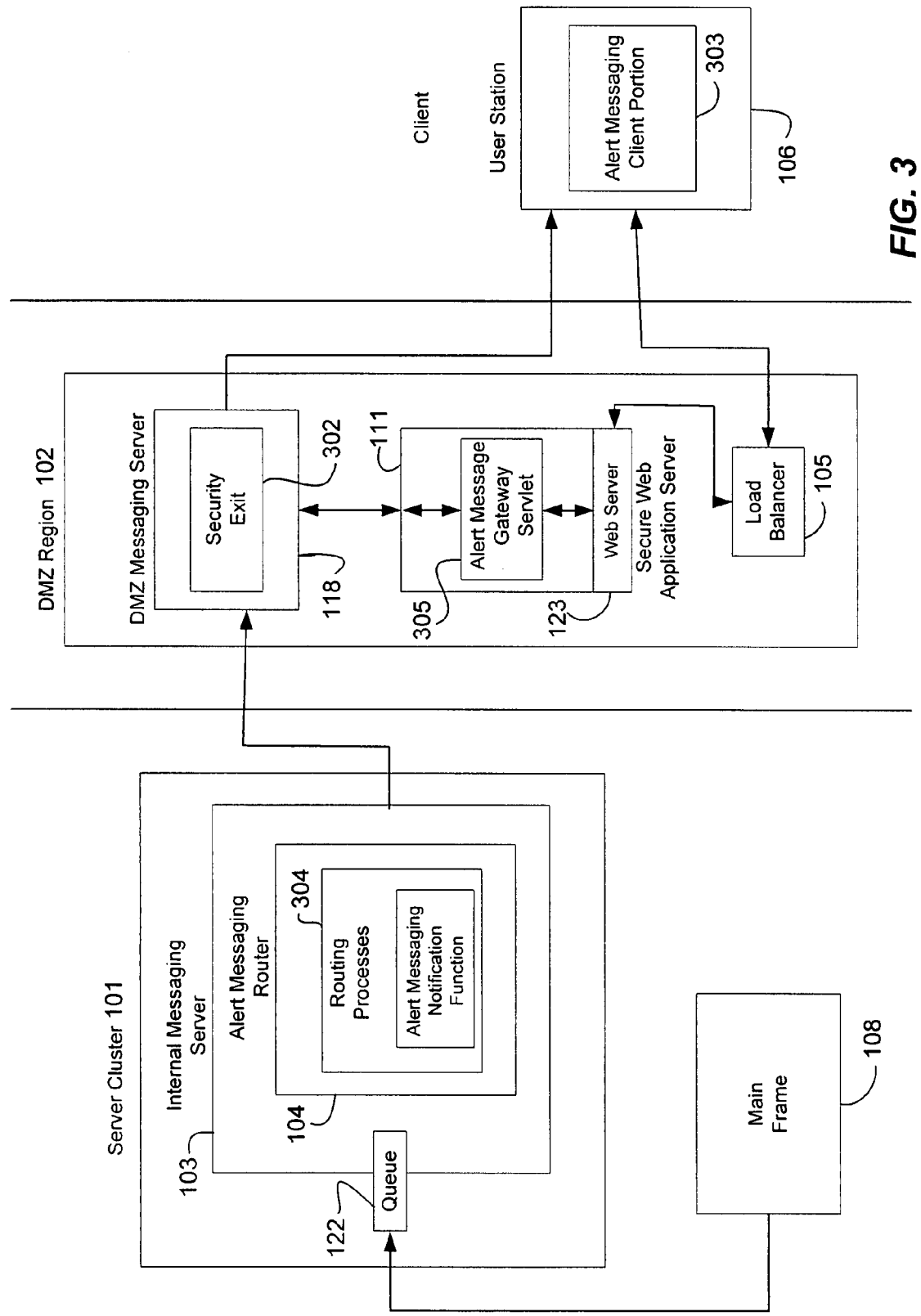
FIG. 3 illustrates the logical relationship among portions of an alert messaging application in an embodiment.

FIG. 3 illustrates the logical relationship among portions of an alert messaging application. Referring to FIG. 3, the alert message routers 104 of internal messaging servers 103 of the cluster 101 may include routing processes 304, which may further include an alert messaging notification function. The routing processes 304 may, in at least one embodiment, provide a software application to receive alert message notifications, or to receive alert message information, from a computer or computer system external to the alert messaging system 100 such as, for example, mainframe 108 using a messaging queue 122. The routing processes 304 may, in an embodiment, assemble the received notification(s) for push to a DMZ messaging server 118. To increase throughput and provide scalability, more than one routing process 304 may monitor a given queue 122 in parallel to manage and route messages.

The alert messaging DMZ server 118 may, in an embodiment, receive the alert message information from the internal messaging server 103 and output alert message notification information to the user station 106 using the network 119. In at least one embodiment, the DMZ messaging server 118 may include a security exit mechanism 302.

The user station 106 may include a client portion of the alert messaging application 303. In at least one embodiment, some or all of the portions of the alert messaging applications 301 through 305 may implement daemon processes to track user login, cache alert message information in a database, and provide alert message content to a server at a particular region such as, for example, a targeted branch office. The client portion of the alert messaging application 303 may include at least a user interface module for outputting received alert message information to a user. This outputting may include, for example, display of the alert message information using the display 245 in the form of an interactive page. The interactive page may be formatted for display using a web browser. For smaller form factor user station 106 embodiments, such as a personal communications terminal or wireless handheld device, the outputting may include, for example, display of the alert message information using the display 245 in the form of an electronic mail text message or limited capability browser page suitable for display using an LCD or LED display.

In at least one embodiment, some or all of the portions of the alert messaging applications 303 through 305 may be implemented using Java source code instructions. In at least one embodiment, the security exit mechanism 302 may be implemented using C source code instructions. In an embodiment, messaging server 103 and 118 may be implemented using C source code instructions. The alert application portions 303-305 may further include an Application Programming Interface (API) (not shown) that provides a set of predefined function parameters and communication standards as are well known in the art, such as a set of function structures or objects to permit the definition and use of customized instructions, in order to facilitate use of the messaging servers 103 and 118 and their integration with other software applications.

In at least one embodiment, the internal messaging server 103 of the cluster 101 may provide alert message information to the router processes 304. In an embodiment, the router processes 304 may, among other things, assemble notification from received alert messages, store this information in the alert messaging database 107 to provide data persistence, and provide routing of notifications to the appropriate DMZ alert messaging server 118. The alert message router processes 304 may retrieve routing information from the MAC/Entitlements database 117 for the appropriate user station 106 based on identification information contained therein. The alert message router 104 may provide an alert message notification to the designated DMZ messaging server 118 of the DMZ region 102 in accordance with the specified routing instructions. The alert message router 104 may include sequences of database access scripts to effect retrieval of user entitlements information, routing information and message notification (type) from the MAC/Entitlements database 117. These database access scripts may be implemented in the form of SQL scripts or calls to database stored procedures, for example.

In at least one embodiment, the alert message router 104 processes 304 may be implemented as a daemon process that listens for messages on a queue (e.g., messaging queue 122) from the mainframe 108 or some other sending mechanism. In at least one embodiment, this daemon process or processes may be implemented as a sequence of programmed instructions using the Java programming language. Upon receiving an alert message from the mainframe 108, the alert message router 104 processes 304 may call stored procedures contained in the alert messaging database based on message type and target application. In an embodiment, the alert message router 104 processes 304 require as input the following information: 1) From the alert messaging database, the identity of client users who are logged in, the DMZ messaging server to which alert messages should be posted, and the type of message received from the mainframe 108; 2) From the MAC/Entitlements database, the client users that map to a specific financial advisor; and 3) the internal messaging server 103 queue in which to connect to receive asynchronous messages from the mainframe 108.

The secure web application server 111 may include the server portion of one or more web applications 305 for accomplishing user registration and login and for providing alert message content to user stations 106 as described herein.

In an embodiment, a message header is provided with each alert message that may include the following fields: a begin header indicator, a unique message identifier, an intrusiveness indicator (e.g., intrusive, non-intrusive, or optionally intrusive), an originator identifier to specify the addressee or originator of the action causing the alert message, a user name to specify the addressee or originator of the action generating the alert message, an application name specifying the application generating the alert message, a message type indicator specifying the type of message (e.g., Content or State), an origination date/time specifying the date and time of message origin, an expiration date/time specifying the date and time of message expiration, an alphanumeric message subject field in which to identify the name or designation for the message, a message text length field to specify in bytes the length of the message, and an end of header indication immediately after which, in an embodiment, the message text follows.

Figure 4A:
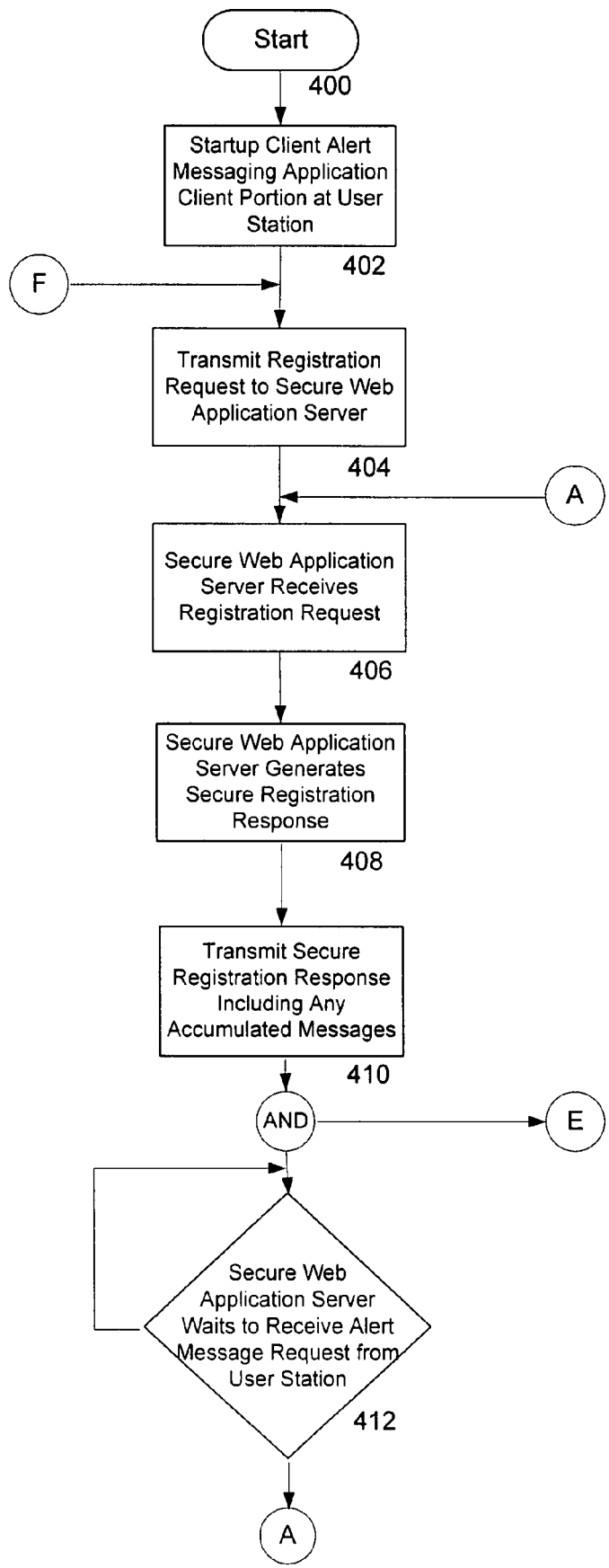
FIGS. 4a through 4d are a flow chart illustrating generally an alert messaging method according to at least one embodiment.

An alert messaging method will now be described. FIGS. 4a through 4d illustrate generally an alert messaging method according to at least one embodiment. Referring to FIG. 4a, an alert messaging method may commence at 400. Throughout FIGS. 4a through 4d, the connectors A through D may further represent wait states associated with the secure web application server, DMZ messaging server, user station, and alert message router processes, respectively, as follows:

Wait state A may be associated with the secure web application server, which "wakes up" when requests from the client are received. In an embodiment, this may occur in two situations. The first is when the client in reaction to receiving a notification asks for content. The second is when actions are taken by the client user at the user station causing state changes that are required to be communicated back to the other elements of the system 100 in order for other user stations looking at the same content to be refreshed.

Wait state B may be associated with the DMZ messaging server, which "wakes up" when the router processes from the cluster place notifications to it or the secure web application server sends state change notifications to it that originated on a user station.

Wait state C may be associated with the user station, which "wakes up." This may occur in two situations. The first is when the user logs into the platform and the client portion of the alert messaging system 100 is automatically started. The second is when notifications are presented to the queue from the DMZ Messaging Server to which it is connected.

Wait state D may be associated with the router processes on the cluster. The router processes on the cluster "wake up" when the sending application places an alert message onto the queue to which it is listening.

At 402, the client portion of the alert messaging application at a user station may commence execution. This may occur in response to a user logging into the platform, causing the client portion of the alert messaging application 100 to automatically start.

Control may then proceed to 404, at which the alert messaging application client portion may transmit a registration request to the secure web application server using the network to register the application session for the requesting user. Registration may refer to the state of an application with respect to the alert messaging system 100. In an embodiment, registration may map an application to a logged in user. Registration may identify the state and context for which alert messages may be sent to a user. The registration request may be formatted in accordance with the Secure HTTP (HTTPS or S-HTTP) protocol. The HTTPS protocol provides for the secure transfer of individual messages. The registration request may be addressed to a URL associated with the alert messaging system, such as a URL associated with a secure web application server, and may further include the application name requested and a user name.

Control may then proceed to 406, at which, in at least one embodiment, a secure web application server may receive and decode the registration request. Upon recognizing the registration request as being addressed to the alert messaging system, the alert message gateway servlet may query the alert messaging database for login and registration state information associated with the requesting user. In particular, in at least one embodiment, the alert message gateway servlet may obtain registration information from the alert messaging database and determine whether or not the requesting user is already registered. If the alert messaging database indicates that the requesting user is already registered, then the alert message gateway servlet of the secure web application server may de-register the user from a registration table (e.g., remove the user record from the registration table) maintained by the alert messaging database and insert into the history table the time of de-registration and then immediately re-register the user. If the user is not already registered, then the alert message gateway servlet may create or reset the user/application registration entry in the registration table maintained by the alert messaging database. Based on the entitlements information received from the alert messaging database, if the secure web application server determines that the requesting user is validly entitled to access the alert messaging system as a message recipient in the capacity of the application for which the user is registering, then control may proceed to 408.

At 408, the secure web application server may generate a secure registration response for the requesting user. In at least one embodiment, the secure registration response may include a unique login value and a password value combination, as well as connection location information, correlation identifier, an alert message handler object, and an identification of the messages available for the corresponding application and user (e.g., a container of messages) that are available to the user. The connection location information may specify a messaging server to which a client user may be attached. The alert message handler object may accommodate all the message types recognized by the identified application along with a mapping to the available states for these message types and client business logic corresponding to that message type. In an embodiment, this may include reviewing the broadcast table in the alert messaging database 107 to find all of the records associated with the requesting user/application and extracting the message content.

Figure 5:
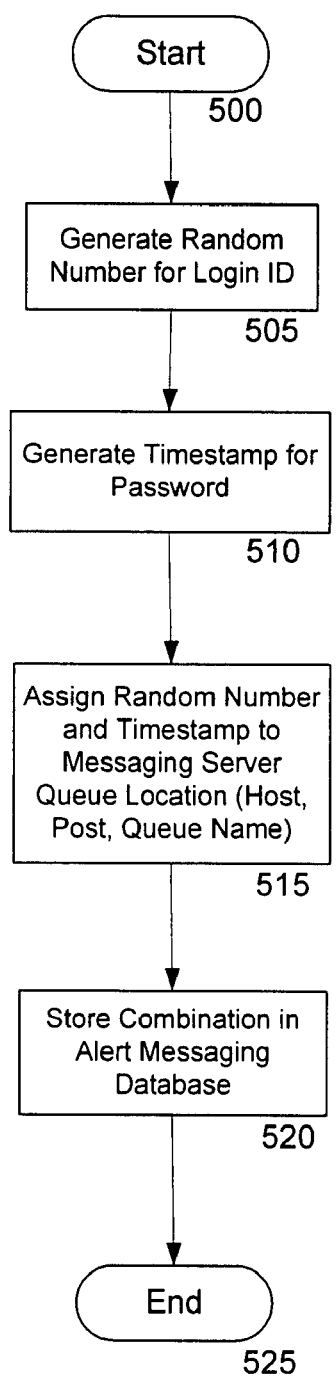
FIG. 5 illustrates a detailed flow diagram of a method to generate a secure registration response in an embodiment.

The login value may include a random number. FIG. 5 provides a detailed flow diagram of the generated secure registration response at 408 of FIG. 4*a*. Referring to FIG. 5, a method of generating a secure registration response 408 may commence at 500. Control may then proceed to 505, at which the secure web application server may generate a random number login value of, for example, an eight-digit random number between 10000000 and 99999999. The random number may be generated according to a variety of random number generation algorithms as are well known in the art such as the random number generators described in, for example, William H. Press et al., "Numerical Recipes in C," Chapter 7, Cambridge University Press 1988.

Control may then proceed to 510, at which the secure web application server may generate a password value using, for example, a timestamp taken at the time the registration request was received at 406. The timestamp may be a multiple digit integer that represents a particular date and time. The timestamp may have a resolution of up to $\frac{1}{300}$th of a millisecond (i.e., $3.333 \times 10^{-6}$ seconds). In at least one embodiment, the password shall only be good (i.e., valid and effective) for one attempt. In an embodiment, the password may be generated, for example, using the following sequence of pseudocode instructions to generate a password of the current time in milliseconds:

The randomid is=String.valueOf ((long) (Math.random ( )*(100000000)));

Java.sql.Timestamp now=new
Java.sql.Timestamp (System.currentTimeMillis( ));

String password=String.valueOf(now.getTime( )).substring(0, 12);

Prior to letting the user proceed, the messaging server may delete or eliminate the password. In at least one embodiment, the password can only be attained using an HTTPS request.

Control may then proceed to 515, at which the secure web application server may assign the random number login identifier of 505 and the timestamp password of 510 to connection information. In at least one embodiment, the connection location information may include an MQ queue location. The MQ queue location information may include a host identifier, port identifier, a queue name, a correlation identifier, messaging server login, and messaging server password for the user station to establish a connection or session with the secure web application server for receiving alert message content. The host identifier and port identifier may be provided in the form of an IP socket. Thus, the secure registration response may include a login value (e.g., a random number between 10000000 and 99999999), a password (e.g., a timestamp), and connection information (e.g., host identifier, port identifier, correlation identifier, and queue name). The secure web application server may associate the secure registration response, or portions thereof, with the requesting user station and, at 520, store the secure registration response and the user station association information in the alert messaging database. In at least one embodiment, the secure registration response may be provided to conform to the Message Queuing Message Descriptor (MQMD) structure provided for use with the messaging server.

Control may then proceed to 525, at which the generated secure registration response 408 may end.

Returning to FIG. 4a control may then proceed to 410, at which the secure web application server may transmit the secure registration response to the requesting user station using the network. The login information is stored in the alert messaging database and therefore shared by the messaging servers and the alert messaging routers. In an embodiment, upon receiving from the secure web application server the indication that the connection to the requesting user station has been granted, the secure web application server may query the alert messaging database, using the information contained in the alert message information request, in order for the alert message gateway servlet to provide accumulated message content to the alert messaging client portion using, for example, an AlertMsgRegistrationInfo object. The message content may be provided in the form of fixed string text information. If all accumulated messages are successfully transmitted, the alert messaging client portion may send an HTTPS formatted message to the secure web application server containing the message identifiers for the messages provided to the user station in a container with their state indicated as DELIVERED. The secure web application server may output the alert message information response to the registered user station in accordance with the connection information specified by the secure registration response and the user station association information. For example, in an embodiment, a logical name may be stored in the alert messaging database which maps to connection parameters in the alert messaging configuration files maintained using the alert messaging database. The secure web application server may format the alert message content in a manner suitable for display by the user station, and output the alert message content to the requesting user station using a network. Control may then proceed to 412 and to 414.

At 412, the secure web application server may wait to receive an alert message request from the user station.

Figure 4B:
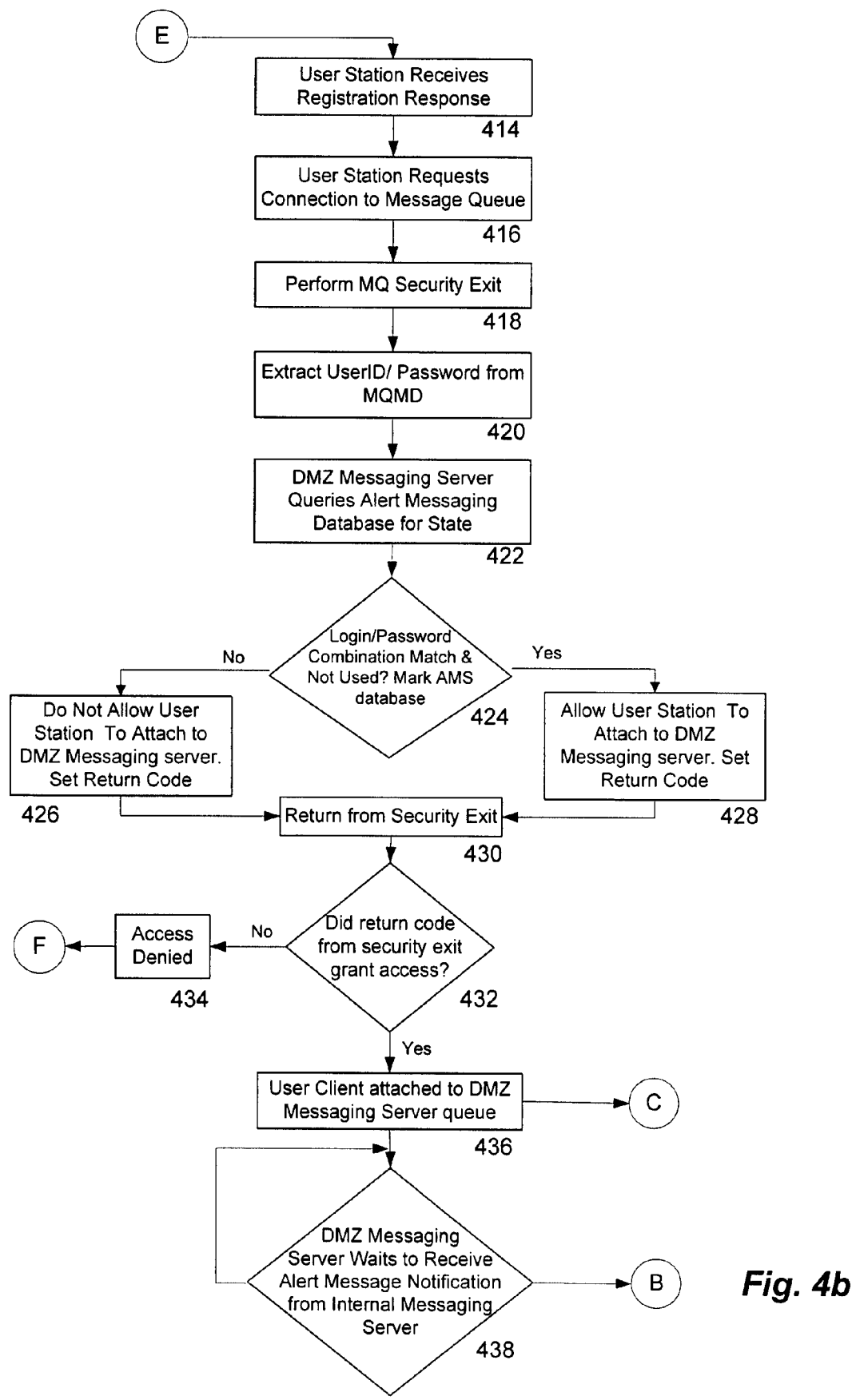

At 414 of FIG. 4b, the user station may send a registration request (or, a request for a registration response) to the secure web application server and receive the secure registration response from the secure web application server. Here, the user station may receive the registration response from the secure web application server as a result of its request at 404 of FIG. 4a.

Control may then proceed to 416, at which, in at least one embodiment, the user station may request the DMZ messaging server to establish a message queue connection for the user station of the requesting user.

Control may then proceed to 418, at which the DMZ messaging server may trigger an MQ security exit.

Control may then proceed to 420, at which the DMZ messaging server may extract the UserID/password information MQMD data.

Control may then proceed to 422, at which the DMZ messaging server may query the alert messaging database to obtain the state information associated with the requesting user station. Control may then proceed to 424.

At 424, using the entitlements and secure registration information received from the alert messaging database, the database stored procedure processing of the security exit may check to see whether or not the particular random number and timestamp combination received in the alert message information request matches or not and whether the combination has been used before to obtain access to the alert messaging system and return the answer as return codes from the stored procedure call. The security exit processing (e.g., database stored procedure called from it) may also mark the login/password as being used and store this indication using the alert messaging database. If the combination matches and has not been used before, then control may proceed to 428. If the combination matches but has been used before, then control may proceed to 426.

At 426, if at 424 it is determined that the combination either does not match or matches but has been used before, then the security exit processing may not allow the requesting user station to connect to the DMZ messaging server. In an embodiment, the security exit processing may indicate denial of access by setting an appropriate return code in the return from security exit. Control may then proceed to 430.

At 428, if at 424 it is determined that the combination matches and has not been used before, then the security exit processing may allow the requesting user station to connect to the DMZ messaging server. In an embodiment, the security exit processing may indicate grant of access by setting an appropriate return code in the return from security exit. Control may then proceed to 430.

At 430, the DMZ messaging server may return from the security exit processing (i.e., exit the security exit mechanism). Control may then proceed to 432.

At 432, the secure web application server may determine if the security exit processing returned an indication to grant access to the alert messaging system by the requesting user station. If access is granted, control may proceed to 436. If access is denied, control may proceed to 434.

At 434, the secure web application server may prevent further access to the alert messaging system by the requesting user station and transmit an indication to the requesting user station that access is denied. In an embodiment, the user station may attempt recovery by initiating the registration sequence again up to a maximum of three additional attempts.

At 436, if there is a match and the combination has not been used before to access the alert messaging system, then the secure web application server may grant access to the requesting user station. In an embodiment, the security exit processing may provide an indication to the messaging server(s) of the DMZ region that a connection has been granted for the requesting user station. In an embodiment, the client portion of the alert messaging system may also be aware of the connection state (e.g., success or failure) through, for example, polling for state information. The security exit processing may also provide to the messaging server(s) of the DMZ region parameters and information associated with the generated registration response by the secure web application server resulting from the request for registration from the user station. Control may then proceed to 438, 444 of FIG. 4c, and 462 of FIG. 4d.

At 438, at which the DMZ messaging server may wait to receive an alert message notification from the alert message router of an internal messaging server (e.g., a messaging server located internal to the cluster 101 of FIG. 1). At this point, the registered user station (e.g., the client instance associated therewith) is capable of receiving alert message notifications and alert messages from the alert messaging system as alert messages received from a sending application (e.g., at the mainframe) in response to a user request. In particular, control may then proceed to 444.

Figure 4C:
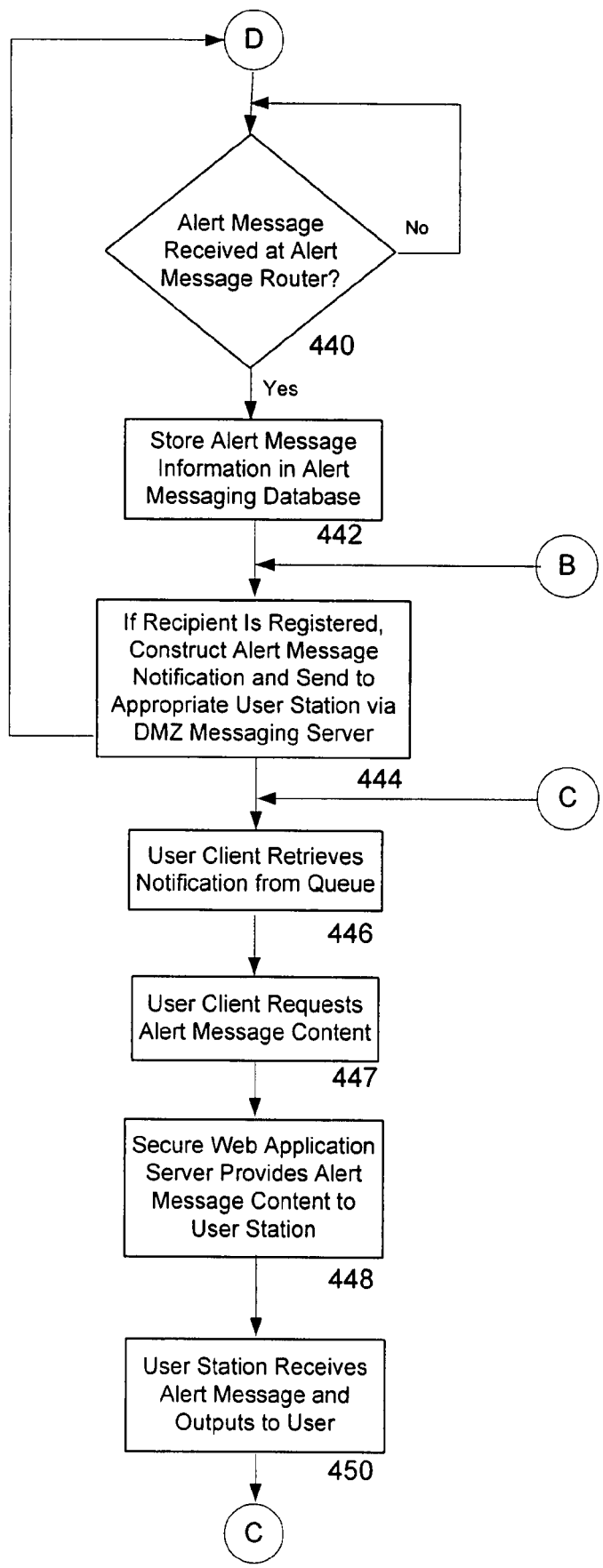
Figure 4D:
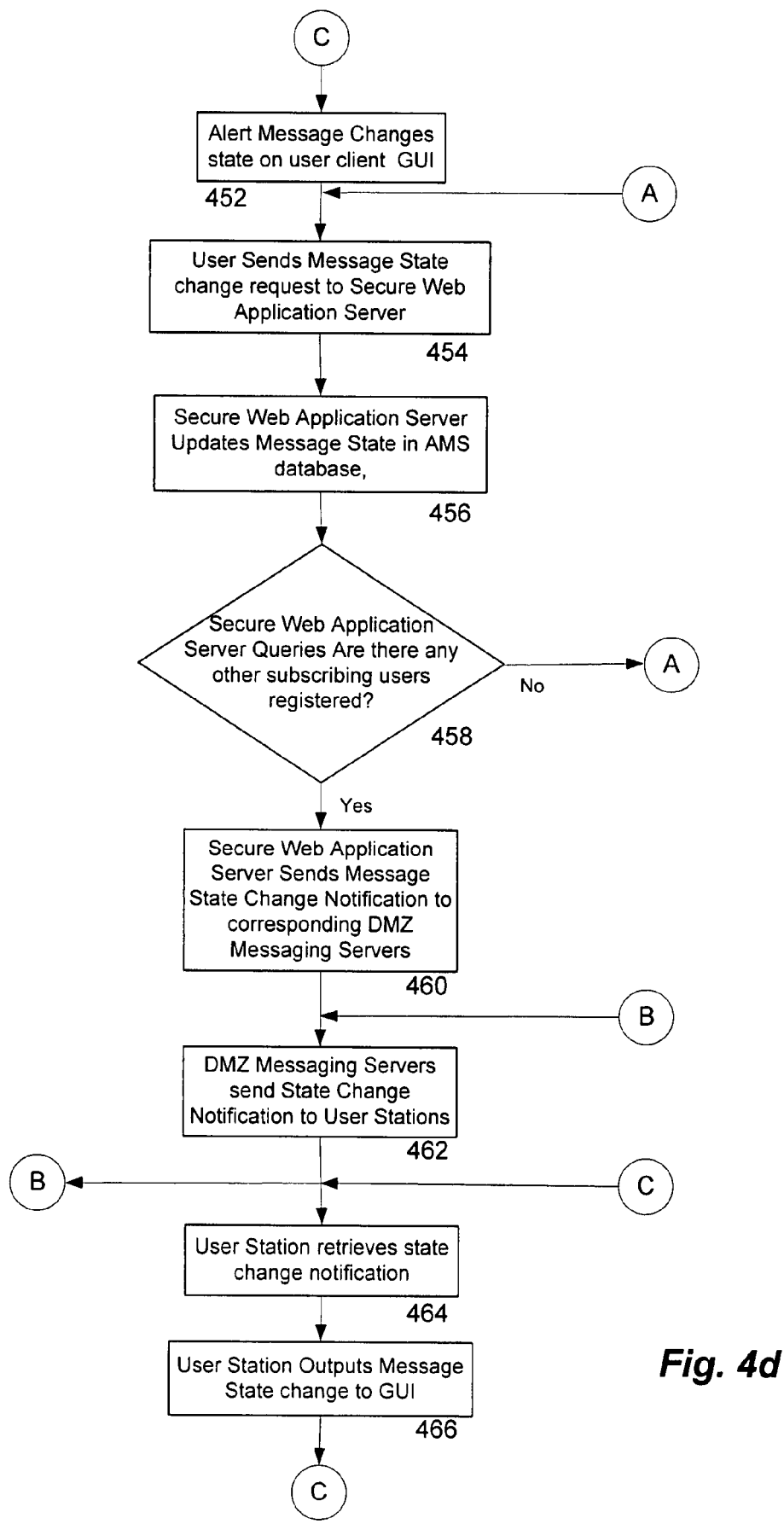

At 440 of FIG. 4c, receipt of an alert message by the alert messaging router from the mainframe may trigger business logic specific to an application associated with the alert message. In an embodiment, the application associated with the alert message may be hosted by the messaging server. Alternatively, the alert message may be associated with an application hosted externally to the alert messaging system. Upon receiving an alert message via, for example, a message queue, the messaging server of the cluster may provide an alert message notification to the alert messaging router. In at least one embodiment, the alert messaging router may serve as a traffic arbitrator or controlling process for the cluster messaging server. The alert messaging router may, for example, store alert messages in the alert messaging database, check for the presence of reviewers, and formulate the notification and send it to the DMZ messaging server. Control may proceed to 442.

At 442, the alert messaging router may store the alert message content received from the sending application (e.g., at the mainframe) and information in the alert messaging database. In at least one embodiment, the alert messaging router processes may store the received alert message in the alert messaging database, timestamp the message, and include an indication that the state of the message is UNDELIVERED. In at least one embodiment, the message table of the alert messaging database may support multiple alert message states to be indicated including, for example and specific to Review and Release messages, DELIVERED, UNDELIVERED, DISPLAYED, REJECTED, CANCELLED and CLOSED. Alert message notifications may be of TYPE STATE in which the notification communicates the state of its corresponding alert message. Control may then proceed to 444.

At 444, if the intended recipient(s) of the alert message is registered, then construct an alert message notification and provide the notification to the appropriate user station via the DMZ messaging server. Additional detail regarding this processing is shown and described with respect to FIG. 6. In particular, in an embodiment, the messaging server of the cluster may provide to a DMZ messaging server of the DMZ region an alert message notification. Upon receiving the alert messaging notification, the DMZ messaging server of the DMZ region may output to the registered user station at least one alert message notification associated with the triggering event (i.e., message). In particular, notification of a triggering event may be an alert message received by the messaging servers of the cluster from the mainframe. The messaging server that hosts an application associated with the triggering event may output an alert message to an alert message router in response to receiving the notification of a triggering event. In an embodiment, the messaging server may format and transmit the alert message to the alert messaging router in accordance with the Java Messaging Service™ (JMS). The alert messaging router of the cluster may format and transmit an alert message notification to the messaging server of the DMZ region in accordance with the Java Messaging Service™ (JMS). The alert messaging router may output the alert message notification to at least one of the messaging servers of the DMZ region as specified by the secure registration response and the user station association information maintained using the alert messaging database. The messaging server of the DMZ region may output the alert message notification to the registered user station in accordance with the Java Messaging Service™ (JMS) using the network.

Figure 6:
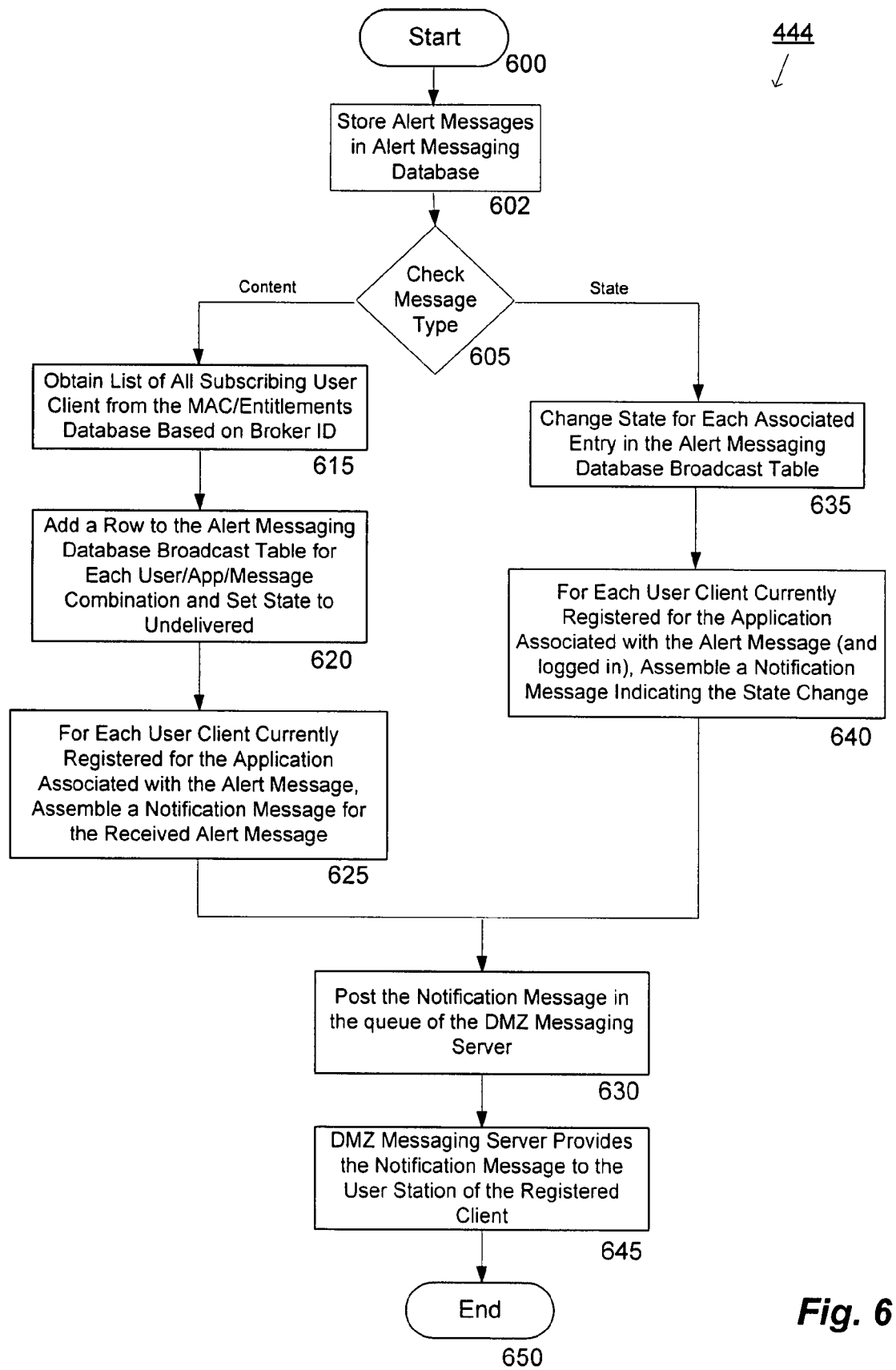
FIG. 6 illustrates a detailed flow diagram of alert messaging router processing in an embodiment.

Further detail concerning alert message router processing at 444 for alert message notifications in an embodiment is shown in FIG. 6. Referring to FIG. 6, outputting an alert message notification may commence at 600. Control may proceed to 602, at which the alert message router processes may store the alert message information using the alert messaging database.

Control may proceed to 605, at which the alert message router processes may determine whether the triggering alert message is a Content message or a State message. In an embodiment, a Content message may be an alert message that includes new message content, while a State message may provide an updated status for an existing alert message. If the alert message router processes determine that the message is a Content message, control may proceed to 615. If the alert message router processes determine that the message is a State message, control may proceed to 635.

At 615, for Review and Release messages, the alert message router processes may obtain from the MAC/Entitlements database a list of all subscribing user clients (i.e., reviewers) associated with the received Content message based on broker identifier included in the received alert message and the broker identifier field for each user listed in the MAC/Entitlements database. In at least one embodiment, the broker identifier may uniquely identify the person who initiated the order. Control may then proceed to 620.

At 620, the alert message router processes may add a row to the broadcast table in the alert messaging database for each user/application/message combination to receive the broadcast Content message. For each entry, in an embodiment, the alert message router processes may set the message state to UNDELIVERED. An alert message may require multiple client users to receive an alert notification; however, not all of the intended recipients may be registered. In at least one embodiment, the alert message router processes may create an entry in the broadcast table of the alert messaging database for each recipient whether or not they are currently registered. Currently registered recipients will receive the alert notification right away, while recipients not currently registered will automatically receive outstanding messages when they do register. Control may then proceed to 625.

At 625, the alert messaging router processes may, for each user client who is currently registered for the application associated with the alert message (including a single user client for a non-broadcast message), assemble a notification message to report the receipt of the Content type alert message. In at least one embodiment, this notification message may include the message identifier, timestamp of receipt, message type (e.g., Content or State), and state (e.g., UNDELIVERED, DELIVERED, DISPLAYED, REJECTED, CANCELLED and CLOSED). Control may then proceed to 630.

At 630, the alert messaging router processes may, using a network, post a message in the queue of the DMZ messaging server with an indication of which user stations are to receive the notification message. In at least one embodiment, the posted message may include a correlation identifier associated with a combination of the user identifier and application identifier. The correlation identifier may be useful for user stations to determine particular alert messages in which they have an interest, and retrieve only those messages. Control may then proceed to 645. In an embodiment, the correlation ID may be placed in the notification.

At 645, the DMZ messaging server may provide the alert message notification message to the user station using a network. In at least one embodiment, the alert message notification message may be provided to the user station in the form of a JMS™ message. The DMZ messaging server may place the alert message notification in a messaging queue to which the user station is connected, from which the user station may retrieve the alert message notification. In an embodiment, the correlation ID may be used by the client to identify all messages to which it is specifically interested, filtering out all others.

Control may then proceed to 650, at which the method of outputting an alert message notification may end.

At 635, for a State type alert message, the alert messaging router processes may update the state for each broadcast table entry associated with the message in the alert messaging database. In at least one embodiment, the states for each State type alert message may include UNDELIVERED, DELIV- ERED, DISPLAYED, REJECTED, CANCELLED and CLOSED. In an embodiment, these states may indicate the status of a trading order, for example. Control may then proceed to 640.

At 640, for each user client currently registered for the application associated with the message identifier of the received State type alert message in the alert messaging database (and provided the user is logged in), the alert messaging router processes may assemble a notification message providing an indication of the state change. In at least one embodiment, this notification message may include the message identifier, timestamp of receipt, message type (e.g., Content or State), and state (e.g., UNDELIVERED, DELIVERED, DISPLAYED, REJECTED, CANCELLED and CLOSED). Control may then proceed to 630 for further processing as described previously with respect thereto.

Returning to FIG. 4c following sending the alert message notification message from the DMZ messaging server to the user station(s) at 444, control may proceed to 446. At 446, the user station client may retrieve the alert message notification from the messaging queue. Control may then proceed to 447.

At 447, the user station may, in response to receiving the alert message notification, request to receive the alert message content for viewing. In an embodiment, the client may request the alert message content by causing the user station to transmit an HTTPS formatted request (using, for example, the pointing device 230) to the secure web application server using a network. In at least one embodiment, the alert message content request may include identification information received in the alert message notification useful to identify a particular alert message.

Control may then proceed to 448, at which the secure web application server may, upon receiving the request for alert message content, obtain the requested alert message content identified in the request from the alert messaging database, format the alert message content in a manner suitable for display by the user station, and output the alert message content to the requesting user station using a network.

Control may then proceed to 450, at which the registered user station may receive the alert message from the secure web application server of the DMZ region and output the received alert message to the user. The client portion of the alert messaging application may include a sequence of programmed instructions for receiving user requests and input and for generating interactive output pages including, in an embodiment, a GUI portion. The GUI portion may generate interactive pages or display screens by which a user may provide data to and receive data from the computer system using a human-machine interface such as, but not limited to, a display. Interactive pages may include user dialog boxes for accepting user entered data. The human-machine interface may also include a hardcopy generating device such as a printer. The user interface module may output Windows® formatted display pages or interactive pages such as, for example, browser formatted pages or world wide web pages. The output interactive pages may output the alert message notification and content information to the user in the form of a popup menu display with an accompanying audible notification. Following output of the received alert message content to the user by the registered user station, control may return to 438 for further processing. At this point, the client may also enter a wait state as denoted by C.

At 452, the user may cause the alert message state to change at the user station as reflected on the user station GUI. Control may then proceed to 454.

At 454, the user station may send a message state change request to the secure web application server. Control may then proceed to 456.

At 456, the secure web application server may update the message status to reflect the new status and store the new message state information in the alert messaging database. Control may then proceed to 458.

At 458, the secure web application server may query the alert messaging database as to whether or not there are other subscribing users currently registered (i.e., other users than the user associated with the user station that sent the state change request). If other subscribing users are currently registered, then control may proceed to 460. If not, control may wait for further input to be received from the client or other clients. For example, other recipients for the state changed message may register, in which case they will receive the alert message in a state that is current based upon the client action taken at this point.

At 460, the secure web application server may send a message state change notification to corresponding DMZ messaging servers. Control may then proceed to 462.

At 462, the DMZ messaging server may send a state change notification to the user stations. Control may then proceed to 464.

At 464, the user station may receive the state change notification. Control may then proceed to 466.

At 466, the user station may output the message state change to the user via the GUI. The user station may then wait for another message to be presented to the messaging queue from the DMZ messaging server to which the user station is connected.

Figure 7:
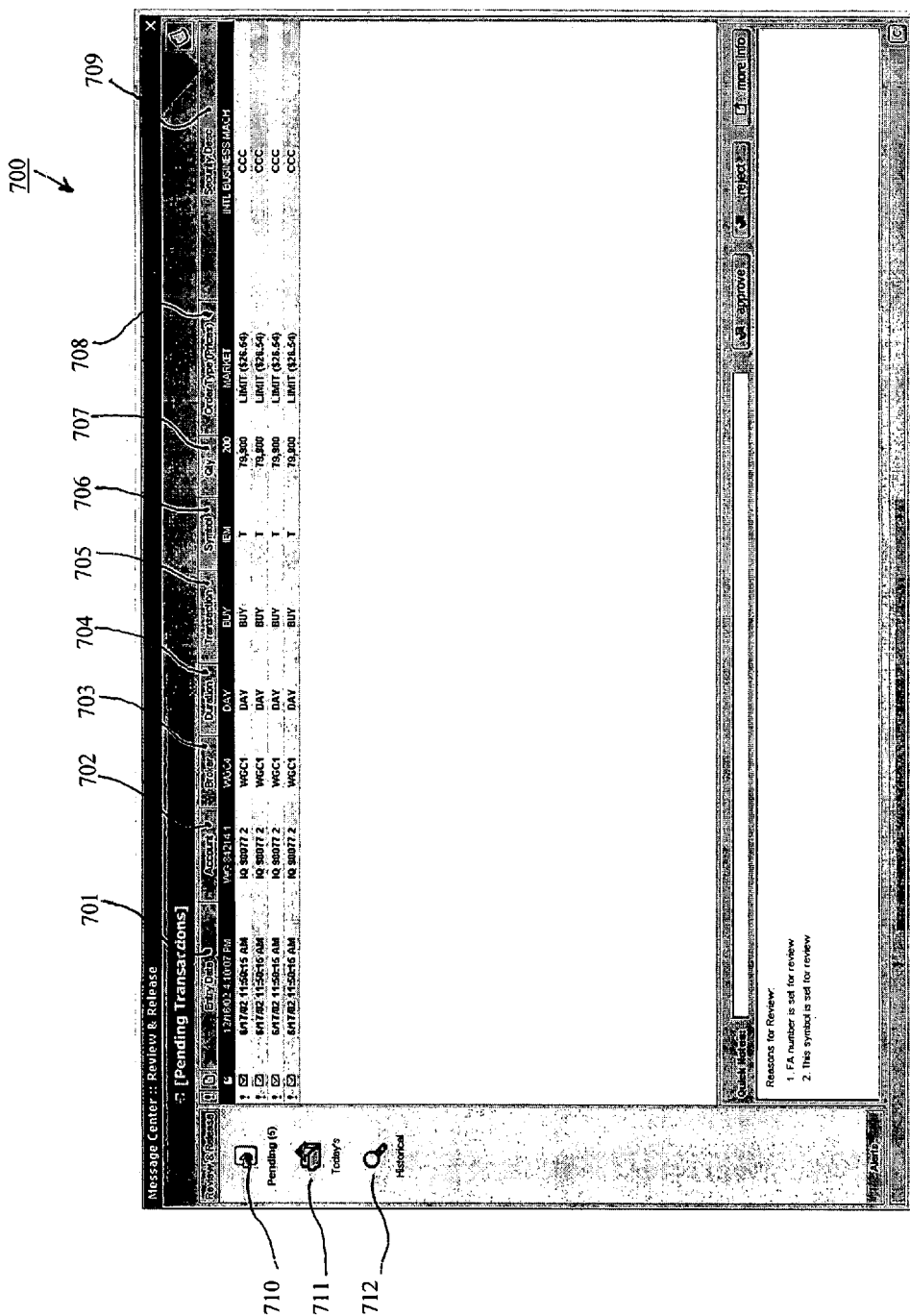
FIG. 7 is an example of an alert message content page for a review and release message according to an embodiment.

In at least one embodiment, the alert messaging system 100 may provide for delivery of a particular kind of alert message referred to as a Review and Release message. An example of an alert message content page 700 for a Review and Release message is shown in FIG. 7. Referring now to FIG. 7, the alert message content page 700 may be provided in the form of an interactive browser formatted page suitable for output to a terminal display. Alternatively, the alert message content page 700 may be provided in a format suitable for viewing using a personal digital assistant or wireless handheld device. The alert message content page 700 may include several descriptive fields. For the example Review and Release message alert message content page 700 shown in FIG. 7, descriptive fields may be provided for each of one or more listed pending transactions, including: entry date 701, account number 702, broker identifier 703, order duration 704, transaction type 705, stock ticker symbol 706, order quantity 707, order type 708, and security description 709. Alternatively, other trade information may be provided in place of or in addition to 701 through 709 such as, for example, estimated settlement date and client identifier. In an embodiment, the entry date 701 may include a date/timestamp for when the order was placed. The account number 702 may specify an alphanumeric client account number at a particular brokerage at which the order was placed. The broker identifier 703 may be an alphanumeric identifier associated with the broker who made the order. The order duration 704 may specify a time period of from one to several days in which the order is allowed to execute. The transaction type 705 may specify the type of transaction for the order (e.g., Buy or sell). The ticker symbol 706 may identify the stock ticker symbol for the security being traded in the order (e.g., "T" is the ticker symbol for AT&T Corporation stock). The order quantity 707 may specify the number of shares of the security being traded. The order type 708 may identify the type of order (e.g., Market Order to be filled at the current market price, or a Limit Order to be executed when the security price reaches or exceeds a particular price). The security description 709 may provide security identification information such as, for example, company name for the issuer of the security.

The alert message content page 700 may output alert message content information according to a variety of operator selectable views. For example, referring to FIG. 7, the example alert messaging content page 700 shows a list of pending transactions provided in accordance with the method illustrated in FIGS. 4a and 4b above in response to an operator selection of the "pending" selection button 710. In an embodiment, other views provided using the alert messaging content page 700 include a list of alert messages for transactions or orders placed on the current day provided in response to operator selection of the "Today's" selection button 711, and a list of alert messages for transactions or orders placed between particular dates entered by the operator in response to operator selection of the "Historical" selection button 712.

Review and Release messages may be a particular type of alert message designed to provide users involved in reviewing trading activities, such as, for example, financial advisors who are reviewers, with immediate alerts regarding trades that require further review before execution in the course of a business day. Specifically, Review and Release messages may denote trade executions that must be reviewed before permission is granted for execution. This may occur when a trade breaches the review constraints individually defined by each correspondent client—number of shares, monetary size of trade, stock ticker, etc. In this case, a financial advisor may have several reviewers assigned to her. If the financial advisor enters a trade that triggers a review, each of the reviewers will receive a Review and Release message identifying the trade to review. If one of those reviewers logs out and logs back in and if that trade has not yet been reviewed by one of the other reviewers, she may receive the message for that trade review again.

In at least one embodiment, the alert messaging system 100 may include a security exit mechanism to prevent unauthorized access to the Review and Release message queues exposed through the firewall or DMZ region 102. The security exit may examine each attempt to connect to the Review and Release message queues and allow or disallow access to those queues accordingly. The security exit may thereby prevent unauthorized individuals from tampering with the contents of the queue. In an embodiment, the security exit mechanism may include a messaging security exit feature through which all connection requests to the internal messaging servers may be processed prior to granting a connection. In an embodiment, this may be a standard product feature of a messaging server product. Furthermore, the security exit feature may make use of the one-time username/password as described herein with respect to FIG. 5 that may manage a continuously refreshed set of passwords for its user base and which provides each valid user with a new password over an encrypted connection for each messaging server connection request.

In at least one embodiment, the security exit mechanism may provide secure real-time messages between a messaging server and a user station over a network. In at least one embodiment, the alert messaging system 100 may provide the capability to output real-time messages using, for example, JMS over a public network such as the Internet. The security exit mechanism may be a one-time use, token-based handshake. The alert messaging system 100 may be thereby configured, using the token-based security exit mechanism, to securely transmit real-time messages between a messaging server and a user station over a network. The token used in the security exit allows a one-time connection to a messaging server for receiving alert messages.

In at least one embodiment, the security exit mechanism may be provided in conformance with the programming interface (e.g., function or object definition) parameters established by a provider of the messaging server at which the security exit mechanism is executed. In at least one embodiment in which the messaging servers may be implemented using, for example, the IBM MQ™ series products, the security exit mechanism may be provided according to the method signature for a security exit specified for use with the messaging server and provided for that purpose. In particular, the method signature to which the security exit mechanism may conform may be an un-implemented function (i.e., a Java method) that provides the name of a function, or method, and its arguments and argument types. The following is an example signature method:

String getInfo(String foo, int bar);

In an embodiment, the signature method may be called when a security exit is triggered. The specific method or function and its arguments may be specified by the messaging server vendor. Users of the security exit may implement the function using, for example, a sequence of programmed instructions that are executed when a security exit occurs. In an embodiment, the ability to trigger and "exit" (security) when a connection request is received by the MQ Manager (e.g., an MQ process running on the MQ server) may be a vendor-provided feature. However, the user may define, using programming instructions, the functions performed by the security exit mechanism. In at least one embodiment, the token is provided as a JMS message that conforms to the required signature method such as, for example, a particular MQMD structure required for use with the messaging server. The token may be, for example, the secure registration response as described herein with the timestamp characters truncated to fit within the required MQMD structure.

Figure 8A:
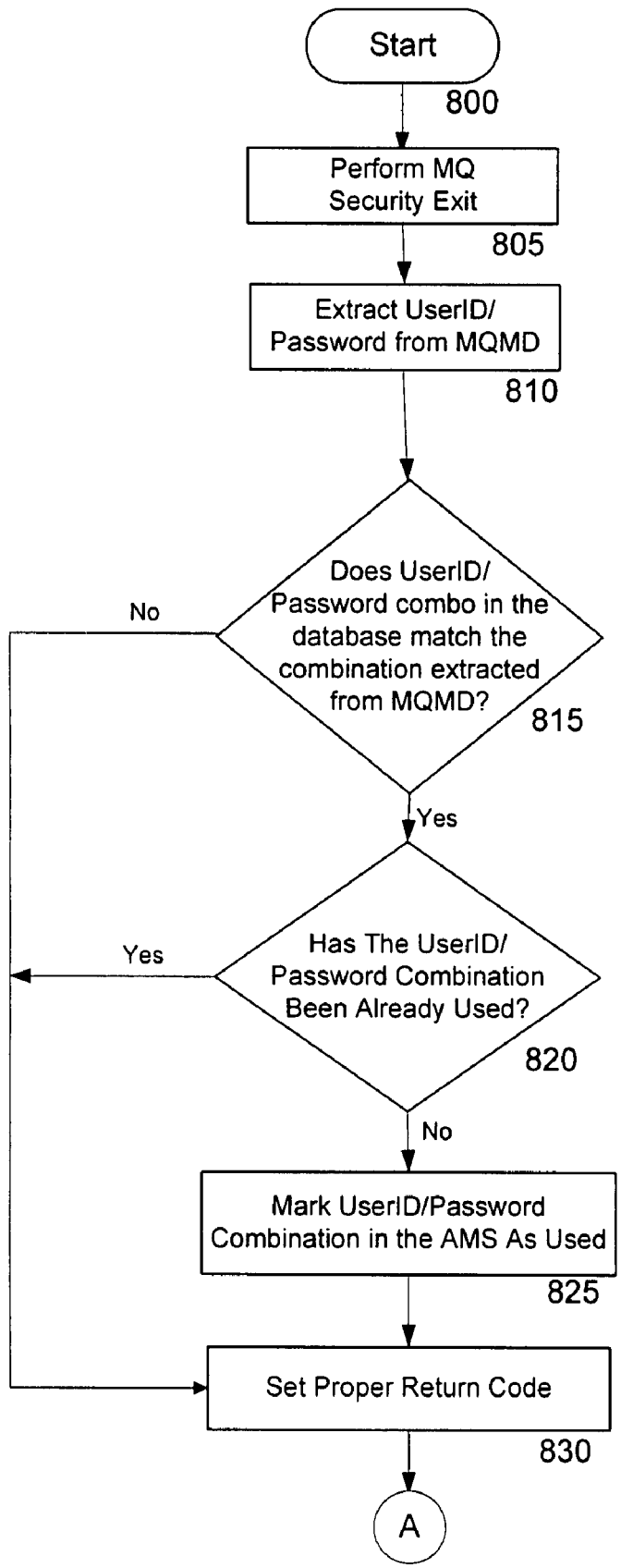
FIGS. 8a and 8b are a flow chart diagram of a security exit method according to an embodiment.
Figure 8B:
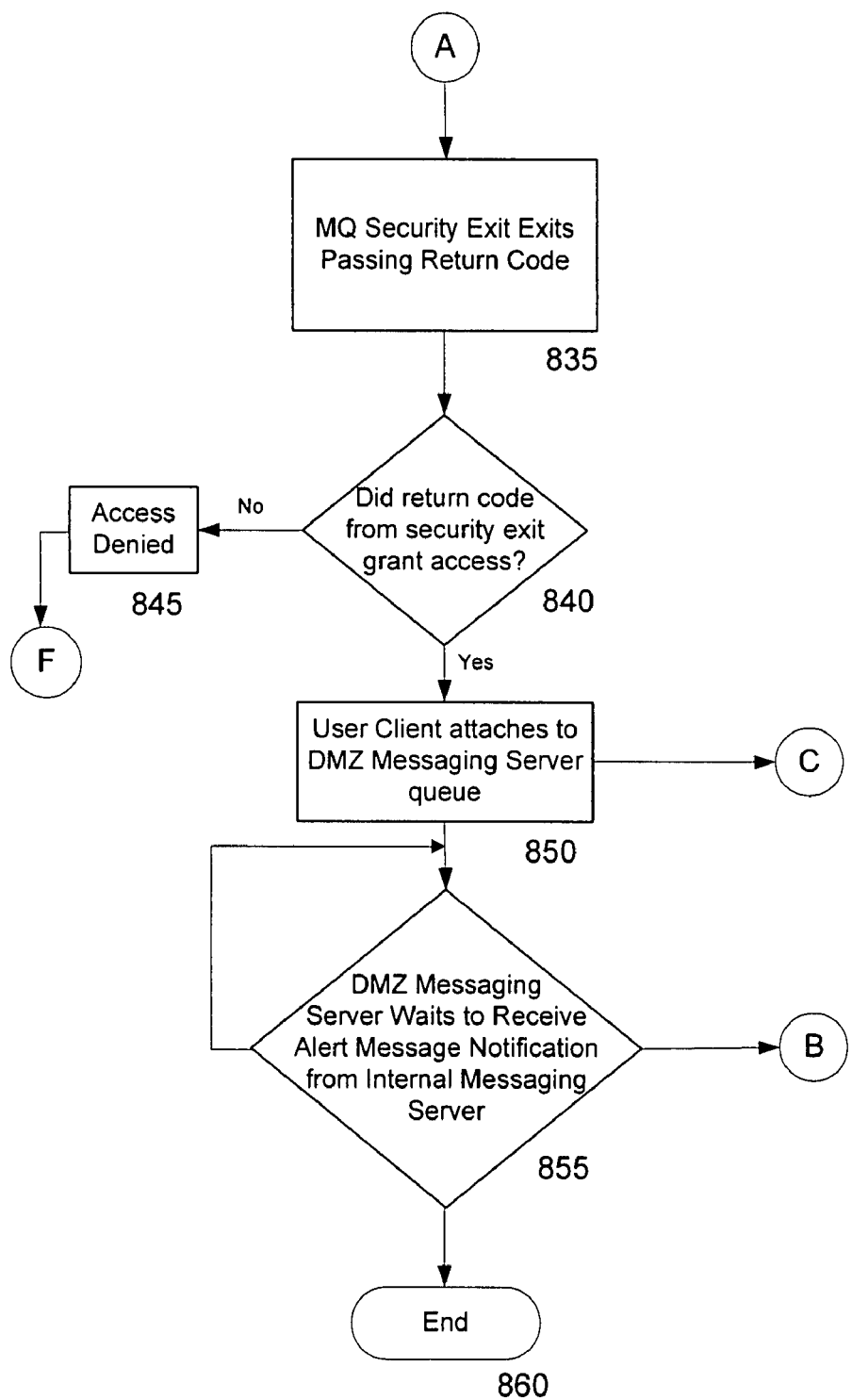

A security exit method of at least one embodiment is shown in FIG. 8. In an embodiment, the alert messaging system 100 provides to the user a one-time token. The user client passes the token to the messaging server to attempt to establish a connection via connection request. The messaging server may then call the security exit mechanism and provide to the security exit mechanism the one-time token. The security exit mechanism verifies that the one-time token is valid, and if and only if the token is valid allows access to the messaging server.

Referring to FIG. 8, a security exit method may commence at 800 and proceed to 805, at which the DMZ messaging server may trigger an MQ security exit. In particular, in an embodiment, the JMS client at the user station may connect to the DMZ messaging servlet of the DMZ messaging server by making a connection request. The DMZ messaging server may invoke a security exit mechanism such as, in at least one embodiment, a C based binary security exit.

Control may then proceed to 810, at which the security exit mechanism may extract the UserID/password information MQMD data.

Control may then proceed to 815, at which the security exit mechanism may query the alert messaging database to obtain the state information associated with the requesting user station. The security exit mechanism may then call a database stored procedure to compare the UserID/password obtained from the alert messaging database to the UserID/password information obtained from the user station. In particular, at 815 and 820, the security exit mechanism may execute a database stored procedure to determine the proper return code to be provided upon exit from the security exit mechanism. In at least one embodiment, using the entitlements and secure registration information received from the alert messaging database, the database stored procedure processing of the security exit may check to see whether or not the particular random number and timestamp combination received in the alert message information request matches or not (at 815) and whether the combination has been used before to obtain access to the alert messaging system (at 820) and return the answer as return codes from the stored procedure call.

Control may then proceed to 825, at which the security exit mechanism may also mark the login/password as being used and store this indication using the alert messaging database. Control may then proceed to 830.

At 830, the security exit mechanism may set the proper return code in accordance with the comparisons of 815 and 820. If the combination matches and has not been used before, then the security exit mechanism may allow the requesting user station to connect to the DMZ messaging server and indicate grant of access by setting an appropriate return code in the return from security exit. If the combination does not match or it has been used before, then the security exit processing may not allow the requesting user station to connect to the DMZ messaging server and indicate denial of access by setting an appropriate return code in the return from security exit. Control may then proceed to 835.

At 835, the security exit instructions may exit the security exit mechanism and pass the return code to the DMZ messaging server. Control may then proceed to 840.

At 840, the secure web application server may determine if the security exit processing returned an indication to grant access to the alert messaging system by the requesting user station. If access is granted, control may proceed to 850. If access is denied, control may proceed to 845.

At 845, the secure web application server may prevent further access to the alert messaging system by the requesting user station and transmit an indication to the requesting user station that access is denied. In an embodiment, the user station may attempt recovery by initiating the registration sequence again up to a maximum of three additional attempts.

At 850, if the combination matches and has not been used before to access the alert messaging system, then the secure web application server may grant access to the requesting user station by attaching of connecting the user station to a DMZ messaging server queue. In an embodiment, the security exit mechanism may provide an indication to the messaging server(s) of the DMZ region that a connection has been granted for the requesting user station. In an embodiment, the client may also be aware of the connection state. The security exit mechanism may also provide to the messaging server(s) of the DMZ region parameters and information associated with the generated registration response by the secure web application server resulting from the request for registration from the user station. Control may then proceed to 855.

At 855, at which the DMZ messaging server may wait to receive an alert message notification from the alert message router of an internal messaging server (e.g., a messaging server located internal to the cluster 101 of FIG. 1). At this point, the registered user station (e.g., the client instance associated therewith) is capable of receiving alert message notifications and alert messages from the alert messaging system as alert messages received from a sending application (e.g., at the mainframe) in response to a user request. At 860, a security exit method may end.

Thus has been shown an alert messaging system 100 and method for secure distribution of alert messages including, for example, Review and Release messages.

While the invention has been described with reference to the certain illustrated embodiments, the words which have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. A secure messaging system, comprising:
   a first messaging server and a separate alert messaging database operating in a private network; and
   a second messaging server and an application server operating in a demilitarized zone (DMZ) network interposed between the private network and a public network;
   the first messaging server in the private network receiving an alert message destined for an intended recipient in the public network, sending the alert message to the separate alert messaging database in the private network for storage, generating an electronic message notification to inform the intended recipient of the alert message, and sending the message notification to the second messaging server in the DMZ network that communicates with the intended recipient;
   the second messaging server in the DMZ network receiving the electronic notification from the first messaging server in the private network and sending the message notification to a client device associated with the intended recipient in the public network;
   the application server operating in the DMZ network receiving a request from the client device for the alert message corresponding to the message notification, retrieving the alert message from the alert messaging database in the private network, and sending the alert message to the client device for presentation to the intended recipient, thereby avoiding direct communication between the first messaging server operating in the private network and the client device operating in the public network.

2. The system of claim 1 wherein the DMZ network interposed between the private network and the public network comprises:
   a region formed interposed between the first messaging server in the private network and the second messaging server and a second firewall interposed between the second messaging server and the public network.

3. The system of claim 1, further comprising:
   a plurality of second messaging servers operating in the DMZ network;
   upon receipt of the alert message, the first messaging server operating in the private network determining one of the plurality of second messaging servers assigned to the intended recipient, and sending the message notification corresponding to the alert message to the assigned one of the plurality of second messaging servers in the DMZ network.

4. A method for secure messaging in a system comprising a first messaging server and a separate alert messaging database operating in a private network and a second messaging server and an application server operating in a demilitarized zone (DMZ) network interposed between the private network and a public network, the method comprising:

at the first messaging server in the private network, receiving an alert message destined for an intended recipient in the public network;

sending the alert message from the first messaging server to the separate alert messaging database in the private network for storage;

at the first messaging server in the private network, generating an electronic message notification to inform the intended recipient of the alert message;

sending the message notification from the first messaging server to the second messaging server in the DMZ network that communicates with the intended recipient;

sending the message notification from the second messaging server in the DMZ network to a client device associated with the intended recipient;

at the application server operating in the DMZ network, receiving a request from the client device for the alert message corresponding to the message notification and, in response, retrieving the alert message from the alert messaging database in the private network and sending the alert message to the client device for presentation to the intended recipient in the public network, thereby avoiding direct communication between the first messaging server in the private network and the client device in the public network.

5. The method of claim 4, further comprising, at the second messaging server operating in the DMZ network:

receiving a connection request from a user through a client device operating in the public network to access message notifications destined for the user as the intended recipient from the first messaging server in the private network;

verifying authentication credentials of the user and authorization for the user to access alert messages from the first messaging server;

upon a successful verification, establishing a connection with the client device in the public network;

receiving electronic notifications of alert messages from the first messaging server in the private network destined for user as the intended recipient in the public network; and sending the message notifications to the client device.

6. The method of claim 4 further comprising:

forwarding the message notification to the client device from the second messaging server over a first communication path from the DMZ network to the public network; and sending the alert message to the client device from the application server over a second communication path from the DMZ network to the public network.

7. The method of claim 4 further comprising at the application server operating in the DMZ network:

receiving a registration request from the client device in the public network to receive message notifications from the first messaging server in the private network through the second messaging server in the DMZ network;

generating a registration response comprising authentication credentials and connection information causing the client to access the second messaging server in the DMZ network; and sending the registration response to the client device in the public network to receive the message notifications from the second messaging server in the DMZ network.

8. The method of claim 4, wherein the system further comprises a plurality of second messaging servers operating in the DMZ network, the method further comprising at the first messaging server operating in the private network:

upon receipt of the alert message, determining one of the plurality of second messaging servers assigned to the intended recipient; and sending the message notification corresponding to the alert message to the assigned one of the plurality of second messaging servers in the DMZ network.

* * * * *